US011167281B2

(12) United States Patent
Vardon et al.

(10) Patent No.: US 11,167,281 B2
(45) Date of Patent: Nov. 9, 2021

(54) CATALYSTS, CATALYST SUPPORTS AND METHODS OF MAKING THE SAME

(71) Applicants: Alliance for Sustainable Energy, LLC, Golden, CO (US); Colorado School of Mines, Golden, CO (US)

(72) Inventors: Derek Richard Vardon, Lakewood, CO (US); Steven T. Christensen, Wheat Ridge, CO (US); Katherine E. Hurst, Golden, CO (US); Amy Elizabeth Maurer, Littleton, CO (US); Michael Brandon Griffin, Denver, CO (US)

(73) Assignees: Alliance for Sustainable Energy, LLC, Golden, CO (US); Colorado School of Mines, Golden, CO (US)

( * ) Notice: Subject to any disclaimer, the term of this patent is extended or adjusted under 35 U.S.C. 154(b) by 0 days.

(21) Appl. No.: 16/535,674

(22) Filed: Aug. 8, 2019

(65) Prior Publication Data
US 2020/0061598 A1 Feb. 27, 2020

Related U.S. Application Data

(60) Provisional application No. 62/720,444, filed on Aug. 21, 2018.

(51) Int. Cl.
*B01J 37/02* (2006.01)
*B01J 35/02* (2006.01)
*B01J 23/44* (2006.01)
*B01J 21/02* (2006.01)
*B01J 23/42* (2006.01)
*B01J 21/06* (2006.01)

(52) U.S. Cl.
CPC .......... *B01J 37/0215* (2013.01); *B01J 21/02* (2013.01); *B01J 21/063* (2013.01); *B01J 23/42* (2013.01); *B01J 23/44* (2013.01); *B01J 35/023* (2013.01)

(58) Field of Classification Search
CPC .... B01J 37/0215; B01J 35/023; B01J 35/026; B01J 35/0006
See application file for complete search history.

(56) References Cited

U.S. PATENT DOCUMENTS

| | | | | |
|---|---|---|---|---|
| 4,792,620 A | * | 12/1988 | Paulik | B01J 31/0231 560/232 |
| 8,056,652 B2 | | 11/2011 | Lockwood et al. | |
| 8,741,800 B2 | | 6/2014 | Elam et al. | |
| 9,403,150 B2 | * | 8/2016 | Lu | B01J 37/12 |
| 9,561,490 B2 | * | 2/2017 | Tanaka | B01J 37/0226 |
| 2002/0005145 A1 | * | 1/2002 | Sherman | B01J 21/06 106/436 |
| 2014/0256966 A1 | * | 9/2014 | Dumesic | B01J 35/02 549/503 |
| 2018/0154345 A1 | * | 6/2018 | Dadheech | B01J 21/04 |
| 2018/0333774 A1 | | 11/2018 | Christensen et al. | |
| 2019/0168190 A1 | * | 6/2019 | Vardon | B01J 35/006 |
| 2019/0345090 A1 | * | 11/2019 | Vardon | B01J 37/0225 |

OTHER PUBLICATIONS

Scelfo et al, Catalysis Communications, Highly efficient catalysts for the synthesis of adipic acid from cis, cis-muconic acid, 2016, 84, pp. 98-102. (Year: 2016).*
Norskov et al, Nature Chemistry, Towards the Computational Design of Solid Catalysts, 2009, 1, pp. 37-46. (Year: 2009).*
Piernavieja-Hermida et al, Nanoscale, Towards ALD thin film stabilized single-atom Pd1 catalysts, 2016, 8, pp. 15348-15356. (Year: 2016).*
W. Kaden et al., 326 Science, 826-829 (2009) (Year: 2009).*
X. Yang et al., 46 Accounts of Chemical Research, 1740-1748 (2013) (Year: 2013).*
Y. Lei et al., 117 The Journal of Physical Chemistry, 11141-11148 (2013) (Year: 2013).*
J. Lu et al., 24 Chemistry of Materials, 2047-2065 (2012) (Year: 2012).*
J. Lu et al., 71 Surface Science Supports, 410-472 (2016) (Year: 2016).*
B. O'Neill et al., 5 ACS Catalysis, 1804-1825 (2015) (Year: 2015).*
Attia et al., "Mesoporous electrode material from alumina-stabilized anatase TiO2 for lithium ion batteries", Journal of Solid State Electrochemistry, 2005, vol. 9, pp. 138-145.
Cheng et al., "Substrate Materials and Deposition Temperature Dependent Growth Characteristics and Photocatalytic Properties of ALD TiO2 Films", Journal of the Electrochemical Society, 2009, vol. 156, No. 8, pp. D275-D278.
Cao et al., "Atomic layer deposited titanium dioxide coatings on KD-II siliconcarbide fibers and their characterization", Applied Surface Science, 2016, vol. 367, pp. 190-196.
Kavan et al., "Lithium Insertion into Zirconia-Stabilized Mesoscopic TiO2 (Anatase)", Journal of the Electrochemical Society, 2000, vol. 147, No. 8, pp. 2897-2902.
Sopha et al., "ALD Al2O3-Coated TiO2 Nanotube Layers as Anodes for Lithium-Ion Batteries", ACS Omega, 2017, vol. 2, pp. 2749-2756.
Vardon, "Atomic layer deposition (ALD) to improve catalyst stability for biobased adipic acid", ACS National Conference, Aug. 22, 2018, pp. 1-28.
Wiedmann et al., "Atomic Layer Deposition for Improved Stability of Catalysts for the Conversion of Biomass to Chemicals and Fuels", Materials Research Society Symposium Proceedings, 2011, vol. 1366, pp. 1-6.

(Continued)

*Primary Examiner* — Alexander R Pagano
(74) *Attorney, Agent, or Firm* — Michael A. McIntyre

(57) ABSTRACT

The present disclosure relates to a composition that includes a core in the shape of a particle having a characteristic length between about one micron and about one millimeter, an active material that includes a noble metal deposited on a surface of the core, and a coating that includes a first metal-oxide, where the active material is positioned between the core and the coating, the active material has a diameter between about one nanometer and about 20 nanometers, and the coating has a thickness between greater than zero nanometers and about 20 nanometers.

8 Claims, 33 Drawing Sheets

(56) References Cited

OTHER PUBLICATIONS

Yoon et al., "Calcination-Temperature-Dependent Shape and Crystal Structure of TiO2 Nanomaterials Synthesized by Hard-Template Method", Journal of Nanoscience and Nanotechnology, 2013, vol. 13, pp. 6069-6073.

Zhang et al., "Phase transformation of nanocrystalline anatase-to-rutile via combined interface and surface nucleation", Journal of Materials Research, Feb. 2000, vol. 15, No. 2, pp. 437-448.

* cited by examiner

Uncoated Pd/TiO₂ after 700°C

5-cycle ALD after 700°C

CATALYSTS, CATALYST SUPPORTS AND METHODS OF MAKING THE SAME

CROSS-REFERENCE TO RELATED APPLICATIONS

This application claims the benefit of U.S. Provisional Patent Application No. 62/720,444 filed Aug. 21, 2018, the contents of which are incorporated herein by reference in their entirety.

CONTRACTUAL ORIGIN

The United States Government has rights in this disclosure under Contract No. DE-AC36-08GO028308 between the United States Department of Energy and Alliance for Sustainable Energy, LLC, the Manager and Operator of the National Renewable Energy Laboratory.

BACKGROUND

Solid catalysts and catalyst supports, as well as electrochemical anodes and cathodes (e.g. as used in solid oxide fuel cells), are often exposed to extreme temperature and chemical environments that includes both normal operation in chemical conversion and regeneration to remove unwanted solid buildup (e.g. coke) from the external and internal surfaces of the solid catalysts. For example, many regenerative processes use high temperature in oxidative conditions or require high operating temperatures. Such treatments, especially when repeatedly cycled between the normal catalyst operating conditions to the potentially more extreme conditions for "de-coking" the catalyst, can result in severe degradation of the catalyst as indicated by, among other things, a loss in porosity, surface area, pore structure and available active material (having catalytically active sites). Thus, there remains a need for improved solid catalysts and catalyst supports (and methods for making them) that are resistant to temperature and/or local environmental swings while maintaining their physical properties and catalytic activity.

SUMMARY

An aspect of the present disclosure is a composition that includes a core in the shape of a particle having a characteristic length between about one micron and about one millimeter, an active material that includes a noble metal deposited on a surface of the core, and a coating that includes a first metal-oxide, where the active material is positioned between the core and the coating, the active material has a diameter between about one nanometer and about 20 nanometers, and the coating has a thickness between greater than zero nanometers and about 20 nanometers. In some embodiments of the present disclosure, the core may include at least one of a second metal-oxide, a carbide, a nitride, and/or a sulfide.

In some embodiments of the present disclosure, the second metal-oxide may include at least one of $Al_2O_3$, $TiO_2$, $CeO_2$, BN, WC, $MoSi_2$, $ZrO_2$, $W_2O_3$, $Nb_2O_5$, $SiO_2$, MgO, $SnO_2$, and/or NiO. In some embodiments of the present disclosure, the second metal-oxide may be $TiO_2$. In some embodiments of the present disclosure, the active material may include at least one of platinum and/or palladium. In some embodiments of the present disclosure, the active material may be in the form of at least one of an amorphous particle and/or a crystalline particle. In some embodiments of the present disclosure, the first metal-oxide may include at least one of $Al_2O_3$, $TiO_2$, $CeO_2$, BN, WC, $MoSi_2$, $ZrO_2$, $W_{2O3}$, $Nb_2O_5$, $SiO_2$, MgO, $SnO_2$, and/or NiO. In some embodiments of the present disclosure, the first metal-oxide may be $Al_2O_3$.

In some embodiments of the present disclosure, a concentration of aluminum in the composition due to the coating may be between 1 wt % and 5 wt %. In some embodiments of the present disclosure, the coating may be conformal. In some embodiments of the present disclosure, the characteristic length may be between one micron and 50 microns. In some embodiments of the present disclosure, the diameter may be between about one nanometer and about 10 nanometers. In some embodiments of the present disclosure, the coating may have a thickness between about 1 nanometer and 5 nanometers. In some embodiments of the present disclosure, the coating may be applied by at least one cycle of an atomic layer deposition method.

In some embodiments of the present disclosure, the composition may further include, after thermally treating the composition at about 700° C. in air for 4 hours, followed by thermally treating at about 200° C. in hydrogen ($H_2$) for 4 hours, a loss in surface area, compared to the composition before the thermally treating, of less than 83%. In some embodiments of the present disclosure, the composition may further include, after the thermally treating, a loss in pore volume, compared to the composition before the thermally treating, of less than 59%. In some embodiments of the present disclosure, the composition may further include, after the thermally treating, a gain in pore radius, compared to the composition before the thermally treating, of less than 178%. In some embodiments of the present disclosure, the composition may further include, after mixing about 15 grams of the composition in about 20 mL of a solution comprising 1 wt % muconic acid in ethanol for 30 minutes, at 200° C., at 1200 rpm, and under a hydrogen atmosphere at a pressure of 40 bar, a loss of the active material into the solution of less than 6 ppm. In some embodiments of the present disclosure, the composition may further include, after mixing about 25 mg of the composition in about 10 mL of a solution comprising 1 wt % naphthalene in tridecane for 75 minutes, at 24° C., at 1600 rpm, and under a hydrogen atmosphere at a pressure of 24 bar, a loss in conversion of the naphthalene to tridecane of less than 36%. In some embodiments of the present disclosure, the composition may further include a crush strength of greater than 13 Newtons.

An aspect of the present disclosure is a method that includes contacting muconic acid with a solid catalyst, where the contacting converts at least a portion of the muconic acid to adipic acid. In some embodiments of the present disclosure, the catalyst used in the method may include a core in the shape of a particle having a characteristic length between about one micron and about one millimeter, an active material that includes a noble metal deposited on a surface of the core, and a coating that includes a first metal-oxide, where the active material is positioned between the core and the coating, the active material has a diameter between about one nanometer and about 20 nanometers, and the coating has a thickness between greater than zero nanometers and about 20 nanometers.

BRIEF DESCRIPTION OF THE DRAWINGS

Some embodiments are illustrated in referenced figures of the drawings. It is intended that the embodiments and figures disclosed herein are to be considered illustrative rather than limiting.

Some embodiments are illustrated in referenced figures of the drawings. It is intended that the embodiments and figures disclosed herein are to be considered illustrative rather than limiting.

REFERENCE NUMBERS

Figure 1:
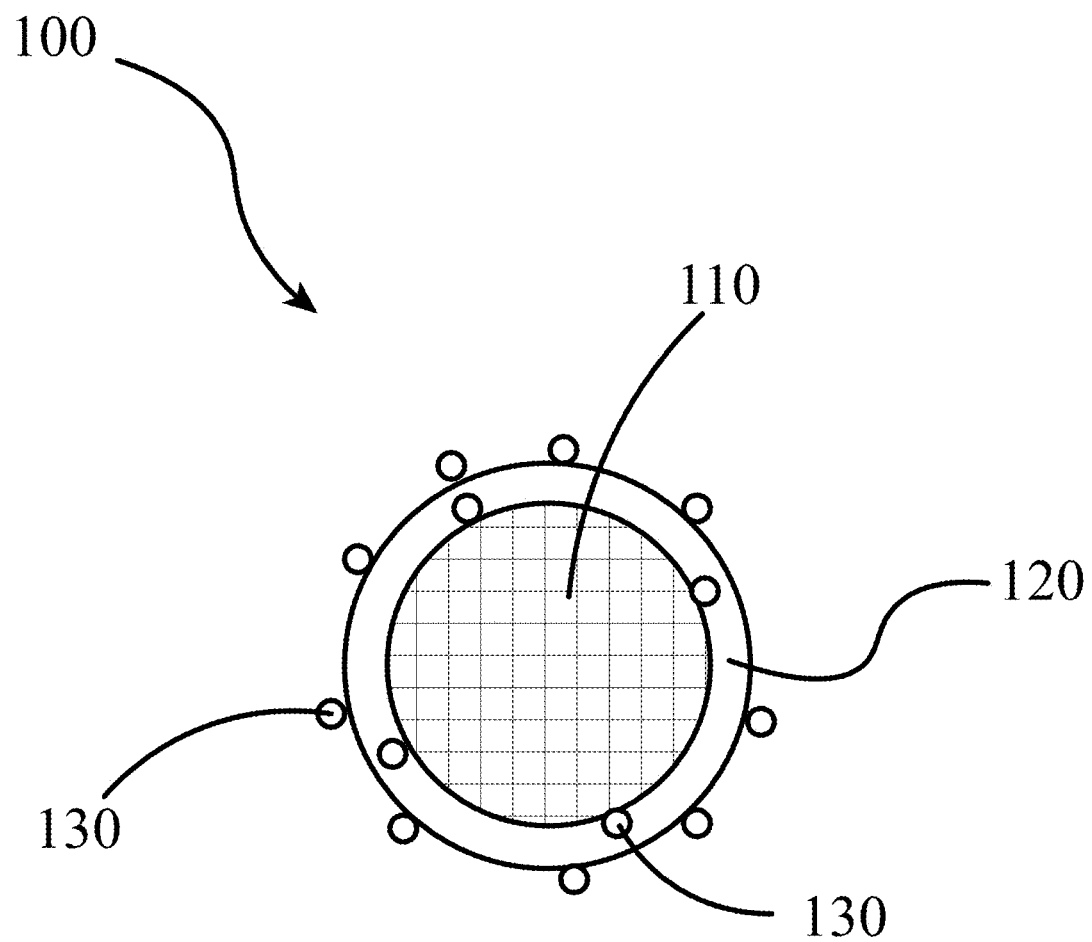
FIG. 1 illustrates a composition that includes a core having an outside surface covered substantially by a coating, according to some embodiments of the present disclosure.

100 . . . composition
110 . . . core
120 . . . coating
130 . . . active material
200 . . . method
210 . . . first depositing
220 . . . intermediate composition
230 . . . applying
240 . . . second depositing
300 . . . method
310 . . . muconic acid
320 . . . contacting
330 . . . adipic acid

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The present disclosure relates to materials, for example catalysts and/or catalyst supports, and methods for making such materials. Among other things, the materials and methods described herein can mitigate chemically, thermally and/or mechanically induced physical and/or chemical changes to the structure, morphology, and/or composition of a material; e.g. a material in the form of a particle. In some embodiments of the present disclosure, such a material may have catalytic properties, although the methods and materials described herein may have non-catalytic uses. In some embodiments of the present disclosure, a solid catalyst may include materials that provide chemically active sites (e.g. for catalytically converting a reactant to a product) where other materials (e.g. catalyst support) provide a structural means to support, maintain, and/or enable the "active sites". In some embodiments, a material may provide both catalytically active sites and structural function. A material, e.g. a catalyst structure, may be defined by its physical and/or performance properties including, for example, at least one of surface area, surface to volume ratio, crystallographic phase or lack thereof, porosity (e.g. including size distribution, volume, and/or type), active site distribution, active site composition, active site quantity, and/or the ability to catalyze a reaction. For the example of catalyst materials, changes to any of these physical and/or performance properties can lead to degradation of the active catalytic sites and/or catalytic activity. Specific to $TiO_2$ catalyst supports, as shown herein, high temperature exposure can result in increased crystallinity and/or anatase to rutile phase change that collapse catalyst pores, dramatically reducing the available surface area and access to active sites necessary for driving chemical reactions. The use of ultrathin $Al_2O_3$ coatings deposited by atomic layer deposition (ALD) on a $TiO_2$ catalyst support is shown herein, among other things, to significantly reduce thermally induced structural collapse.

FIG. 1 illustrates a composition 100, e.g. a solid catalyst, that includes a core 110 having an outer surface that may be substantially covered by a coating 120. In some embodiments of the present disclosure, the composition may further include an active material 130, positioned on at least one of the outer surface of the core 110 and/or an outer surface of the coating 120. In the example of FIG. 1, the composition 100 is shown in the form of a spherical particle. However, other shapes for the core 110 may be used and are considered within the scope of the present disclosure; e.g. films, layers, ribbons, and/or any other shape suitable for the particular application and/or chemistry being considered. The core 110 may be in a substantially spherical and/or cylindrical shape and/or any other suitable shape. The core 110 may be in a range of sizes including powders (having a characteristic length between greater than zero microns and less than 50 microns), granules (on the order of 1 mm), pellets (greater than 1 mm), and monoliths. Monolithic catalysts may be in the form of an extruded solid material containing multiple intersecting pore channels and/or networks that may have substantially circular cross-sections with diameters between about 10 mm and about 150 mm, channel sizes having cross-sectional areas between about 1 $mm^2$ and about 100 $mm^2$, and characteristic lengths between about 10 mm and about 1000 mm, which may be coated with catalytically active species. A core 110 may be crystalline and/or amorphous.

The active material 130 may include catalytically active materials such that the composition 100 has catalytic activity for a targeted reaction; e.g. palladium for the hydrogenation of muconic acid to adipic acid. In some embodiments of the present disclosure, an active material 130 may include an element and/or compound in the form of a particle, a crystal, and/or a nanocrystal. Thus, in some embodiments of the present disclosure, an active material 130 may include at least one noble metal, such as platinum and/or palladium. Such active material particles may be deposited onto a surface of the solid support 110 by any suitable method, e.g. incipient wetness, ion exchange, strong electrostatic adsorption, nanoparticle dispersion, chemical or physical vapor deposition, and/or ALD. An active material 130 may assume a shape such as spherical, cylindrical, cubic, octahedral, cuboidal/columnar, tetrahedral, and/or any other suitable shape. An active material 130 may be at least one of crystalline, polycrystalline, and/or amorphous. An active material 130 may be provided in a range of diameters that include extremely disperse particles with a diameter less than 1 nm, highly dispersed particles with a diameter between about 1 nm and about 10 nm, moderately dispersed particles with a diameter between about 10 nm and about 20 nm, and minimally dispersed particles with a diameter greater than 20 nm.

Referring again to FIG. 1, as described herein, among other things, a coating 120 may provide to the composition 100 and the core 110 enhanced stability to extreme process conditions, including at least one of mechanical attrition, thermal cycling, the presence of water, and/or chemical exposure, where the enhanced stability is demonstrated by reduced or eliminated degradation (and/or degradation rate) to at least one physical property and/or performance property of the composition 100 and core 110; e.g. crystal structure, a physical structure, a pore volume, a surface area, a composition, and/or a catalytic activity. In some embodiments of the present disclosure, a coating 120 may be a conformal coating, covering the outer surface of the core 110 and/or active material 130 in its entirety. In some embodiments of the present disclosure, a coating 120 may cover a portion of the outside surface of the core 110 and/or active material 130, for example, that is less than 100% of the outside surface of the core, less than 90% of the outside surface of the core, less than 80% of the outside surface of the core, and/or less than 70% of the outside surface of the core. In some embodiments of the present disclosure a coating 120 thickness may be between about one nanometer and about five nanometers. In some embodiments of the present disclosure, a coating 120 may have a thickness greater than five nanometers. A coating 120 may adopt a form of at least one of one or more complete layers and/or one or more partial layers that cover specific targeted surfaces of the catalyst (e.g. specific crystallographic facets) the catalyst 100, the core 110, and/or the active materials 130.

Referring again to FIG. 1 in some embodiments of the present disclosure, a coating 120 may be applied by ALD to a core 110 and/or active material 130 where the core 110 may include at least one of a metal-oxide, a carbide, a nitride, a sulfide, and/or a carbonaceous material. In some embodiments of the present disclosure the core 110 may include at least one of a porous carbonaceous material (e.g. activated carbon) and/or a porous oxide (e.g. at least one of $TiO_2$, $Al_2O_3$, $SiO_2$, etc.), where coating of the core 110 results in the improvement of the thermochemical and/or mechanical stability of the resultant composition 100, e.g. coated core, relative to the uncoated core. Among other things, such coated compositions 100 may be used as a catalyst and/or catalyst support. As shown herein, such coatings 120 can mitigate unwanted physical and/or chemical changes that can occur under thermal and/or mechanical stresses including, but not limited to, collapse of pore structure, loss of surface area, and/or changes to crystal phases. In some embodiments of the present disclosure, a coating 120 may be a thin film covering the underlying material (e.g. core) in a sub-monolayer and/or monolayer fashion, where the film thickness can be less than one nanometer. Furthermore, as shown herein, a coating 120 may have minimal or negligible negative impact on catalytic performance, where the composition 100 still provides access by a reactant to the active sites for catalysis. Examples of materials suitable for coatings 120 include at least one of aluminum oxide ($Al_2O_3$), titanium oxide ($TiO_2$), cerium oxide ($CeO_2$), boron nitride (BN), tungsten carbide (WC), molybdenum disilicide ($MoSi_2$), zirconium oxide ($ZrO_2$), tungsten oxide ($W_2O_3$), niobium oxide ($Nb_2O_5$), silicon oxide ($SiO_2$), magnesium oxide (MgO), tin oxide ($SnO_2$), and/or nickel oxide (NiO). In some embodiments of the present disclosure, at least one of the coating 120, the core 110, and/or the active materials 130 may more successfully and reliably operate in a temperature regime up to 800° C. in vacuum, while also in an oxidizing environment, in a reducing environment, and/or in harsh chemical (e.g. acidic, caustic) environments, than the equivalent core 110 and/or active material 130 not having a coating 120.

For catalysis applications, as shown herein, a coating can protect the underlying material, e.g. core and/or active material, by preventing or minimizing changes to at least one physical property and/or characteristic of the underlying material, for example, pore structure, crystalline phase, surface area, and/or composition during thermal exposure. Examples of catalyst supports, materials for the core of a composition, include at least one of an oxide, a carbide, a nitride, a sulfide, and/or a carbonaceous material. The coating may also protect metallic catalyst components (e.g. active materials) from thermally induced physical and/or chemical changes. An example of a specific scenario are catalyst applications requiring high temperature regeneration of the catalyst. High temperatures catalyst regeneration (>400° C.) to remove carbonaceous deposits (e.g. coking and/or organic fouling) is common in industrial applications. However, these high temperatures, especially in combination with cycling between relatively low temperatures and the relatively high regeneration temperatures can cause the unwanted physical and/or chemical changes described above. The coatings described herein can minimize or eliminate these unwanted changes from occurring to the coated compositions. In addition, the coatings described herein may also reduce mechanical damage and/or attrition to the coated materials that can occur due to common process operations, for example fluidization in fluidized bed reactors, as well as during normal shipping/handling.

As described herein, in some embodiments of the present disclosure, coatings are applied to underlying materials by a primary vapor-phase synthesis method, e.g. atomic layer deposition (ALD). ALD typically relies on self-limiting reactions determined by a temperature process window that enable layer-by-layer deposition. ALD is a branch of chemical vapor deposition (CVD). Thus, other coating technologies within the scope of the present disclosure include general CVD, plasma assisted ALD, thermal ALD, and/or electrochemical ALD, physical vapor deposition, as well as non-vapor-phase methods such as solution methods. Among other things, the ALD methods described herein differ from other ALD methods by providing the ability of using ultra-thin $Al_2O_3$ ALD coatings that require no thermal activation and significantly reduce $TiO_2$ catalyst support thermal structural collapse.

Figure 2:
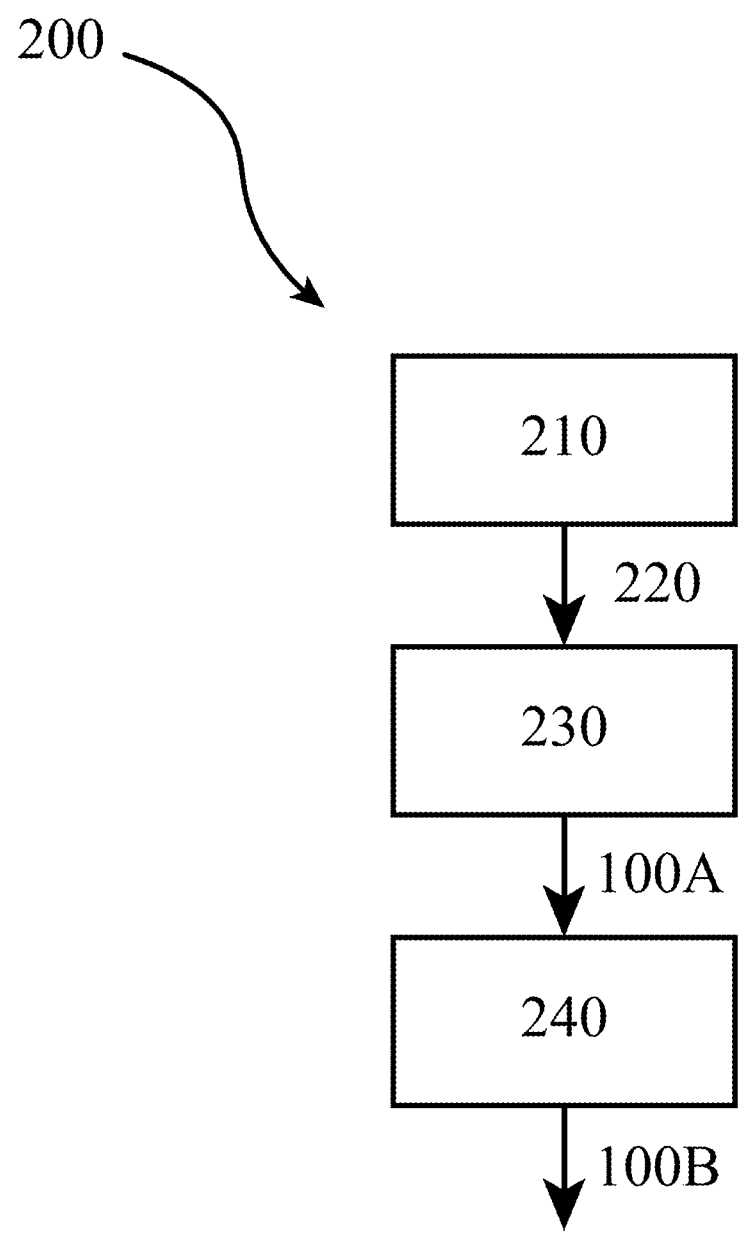
FIG. 2 illustrates a method for synthesizing a composition like that illustrated in FIG. 1, according to some embodiments of the present disclosure.

FIG. 2 illustrates a method 200 for making a composition 100, as described above. The method 200 may begin with the first depositing 210 of an active material 130 (e.g. catalytically active crystals) onto a core 110, resulting in an intermediate composition 220. The method may then proceed with the applying 230 of a coating 120 to an outer surface of the core 110, such that the coating 120 covers substantially all of the active material 130 and the core 120, yielding the targeted composition 100A. In some embodiments of the present disclosure, the method 200 may proceed to a second depositing 240 of the active material 130, and/or some other material, to at least a portion of an outer surface of the coating 120, yielding composition 100B. As described herein the applying 230 may be performed by ALD and the resultant composition 100 may possess enhanced stability as demonstrated by a reduced and/or eliminated degradation and/or degradation rate to at least one physical property and/or performance metric of the composition 100, relative to a composition that does not have the coating 120; e.g. crystal structure, a physical structure, a pore volume, a surface area, a composition, and/or a catalytic activity. In some embodiments of the present disclosure, a coating 120 may be applied to a core 110, followed by the depositing of an active material 130 onto the coating. This exemplary method may, among other things, result in a final composition 100 (100A and/or 100B) having improved thermal stability and/or crush strength.

Figure 3:
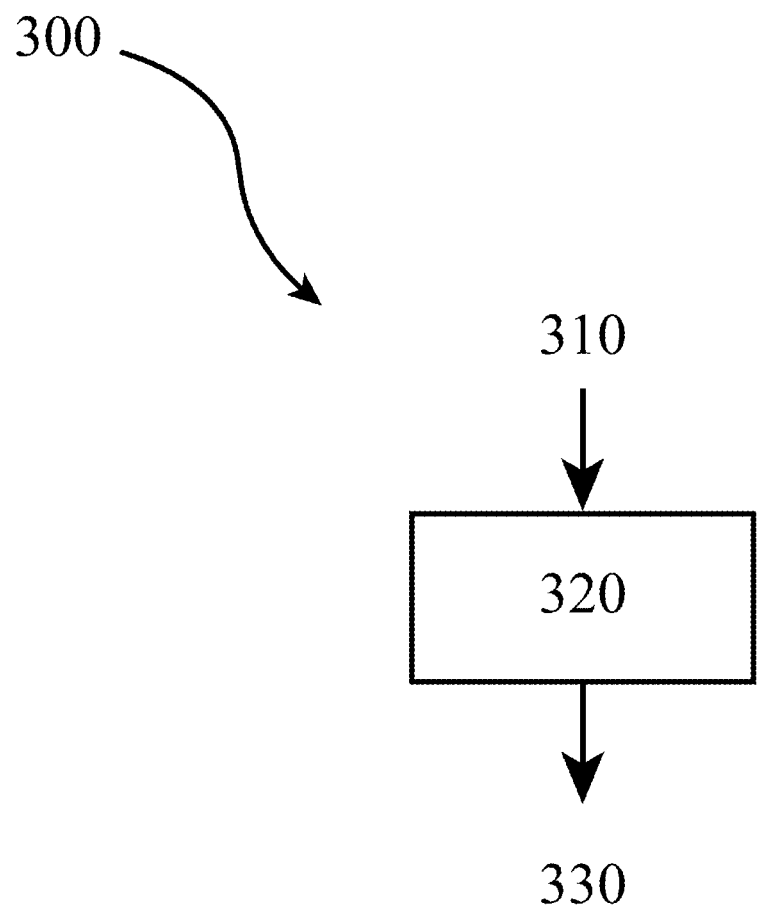
FIG. 3 illustrates a method for converting muconic acid to adipic acid, using a catalyst like that illustrated in FIG. 1, according to some embodiments of the present disclosure.

FIG. 3 illustrates a method 300 for converting muconic acid 310 to adipic acid 330 by contacting 320 the muconic acid 310 with an ALD-produced, coated catalyst (not shown). Such a method may take place in at least one of a condensed phase and/or a vapor phase. Reactor configurations may include at least one of a batch system and/or a continuous flow systems such as a three-phase slurry reactor, a stirred batch reactor, a loop reactor, or a packed-bed reactor. Process conditions may include a temperature between about 20° C. and about 150° C. and a hydrogen pressure between about 1 bar and about 100 bar. For the example of a slurry reactor, process conditions may include the use of fine catalyst particles (with a characteristic length less than 100 micron) and/or granular catalyst particles (with a characteristic length between about 100 micron and about 1 mm), with muconic acid dissolved in a solvent (e.g. at least one of methanol, ethanol, tetrahydrofuran, acetone, acetic acid, ethyl acetate, γ-valerolactone, and/or other solvents in which muconic acid is soluble) at a first concentration between about 1 wt % and about 50 wt % in solution, and the catalyst at a second concentration between about 1 wt % and about 20 wt % of solution. The slurry reactor may operate at a residence time between about 5 minutes and about 300 minutes. For the example of a packed bed reactor operation, operating conditions may include the use of fine catalyst particles (with a characteristic dimension less than 100 micron), granular catalyst particles (with a characteristic dimension between about 100 micron and about 1 mm), and/or catalyst pellets (with a characteristic dimension greater than 1 mm) with muconic acid dissolved in a solvent (as described above for the a slurry reactor). In some embodiments of the present disclosure, a muconic acid solution may be co-fed to a reactor (e.g. slurry reactor and/or packed bed reactor) with hydrogen gas flowing at a hydrogen to muconic acid molar ratio between about 1:1 and about 1:100. A packed bed reactor may operate with a weight hour space velocity (mass of muconic acid processed per mass of catalyst per hour) between about 0.05 $h^{-1}$ and about 15 $h^{-1}$.

position, in the form of particles, was vacuum filtered and dried overnight at room temperature. The catalyst (at this point uncoated $TiO_2$ core particles having palladium on the surface of the core particles) was subsequently loaded into a tube furnace, dried at 110° C. for 2 hours in 200 sccm of $N_2$, and reduced at 150° C. in 200 sccm of $H_2$ for 4 hours.

$Al_2O_3$ ALD Coatings.

$Al_2O_3$ coatings were deposited by ALD on the powder/particle Pd/$TiO_2$ catalyst composition described above, after being sieved to pass through 80 mesh (<180 μm) using an ALD fixed bed configuration. The uncoated catalyst composition was held in in a 1.5"×2" stainless steel tray placed horizontally in the reactor. The $Al_2O_3$ precursors, trimethylaluminum (TMA) and $H_2O$, were held at room temperature. The Pd/$TiO_2$ catalysts were coated by ALD with 1, 5, and 10 cycles of $Al_2O_3$ using stop-flow mode ALD at 200° C. with TMA and $H_2O$ precursors, resulting in 1, 5, and 10 layers of $Al_2O_3$ coatings. In stop-flow mode, one half cycle consisted of dosing the Pd/$TiO_2$ sample with the precursor, exposure of the sample to the precursor isolated from the pump, a purge at higher flow rates, followed by evacuation of the chamber. These steps were followed for both TMA and $H_2O$. One full ALD cycle consists of two half cycles, the first with TMA and the second with $H_2O$. The timing and carrier gas (99.9999% nitrogen) flow parameters for $Al_2O_3$ ALD are provided below in Table 1. The operating pressure was approximately 1 torr when the carrier gas was flowing.

TABLE 1

$Al_2O_3$ ALD coating parameters for Pd/$TiO_2$ (active material/core).

| Precursor | TMA | | | | H2O | | | |
|---|---|---|---|---|---|---|---|---|
| Condition | Dose | Exposure | Purge | Evacuate | Dose | Exposure | Purge | Evacuate |
| Time (sec) | 3 | 80 | 60 | 15 | 3 | 80 | 60 | 15 |
| $N_2$ Flow (sccm) | 200 | 20 | 200 | 0 | 140 | 75 | 200 | 0 |

Results Data Set #1: Palladium Active Material on $TiO_2$ Core, Coated with $Al_2O_3$ by Fixed-Bed ALD—Thermal Aging and Muconic Acid to Adipic Acid Conversion Synthesis of Pd/$TiO_2$.

Pd/$TiO_2$ catalysts (the core material $TiO_2$) having active material (palladium on the surface of the core) were prepared as follows. A pelletized $TiO_2$ core (Alfa Aesar) was ground and sieved prior to loading with palladium active material. Pd/$TiO_2$ samples were prepared with $TiO_2$ core particles sieved to between 30 mesh and 50 mesh (corresponding to between 300 μm and 600 μm) to facilitate focused ion beam (FIB) lift-out for scanning electron transmission assisted energy dispersive x-ray spectroscopy (STEM-EDX) characterization, as well as $TiO_2$ core particles sieved to less than 140 mesh (corresponding to less than 105 μm) to facilitate catalyst activity testing with negligible mass transfer limitations. Palladium active material was deposited onto the $TiO_2$ core particles by adapting methods for strong electrostatic adsorption using pH adjustment. Briefly, for the preparation of 10 grams of catalyst, crushed and sieved $TiO_2$ core particles were added to a large beaker with ~350 mL of deionized (DI) water. The solution was then raised to pH 11 using NaOH to deprotonate the surface of the $TiO_2$ core particles. In a separate beaker, tetraaminepalladium (II) chloride monohydrate (Sigma Aldrich) was added to ~200 mL of DI water. Both solutions were then combined, readjusted to pH 11, and stirred at 500 rpm for at least 48 hours. After stirring, the catalyst com- Batch Reactor Testing.

Batch reactor screening was performed in a Parr multi-batch reactor system. Catalyst samples (between about 10 mg and about 15 mg, sieve size less than 80 mesh) were loaded into the reactors with 20 g of 1 wt % cis,cis-muconic acid (Sigma Aldrich) in ethanol. The reactors were purged with inert gas three times and pressurized with $H_2$ to 350 psig at room temperature. Catalyst testing was performed in duplicate to measure muconic acid hydrogenation activity and Pd leaching. After the reaction was complete, the reactor contents were vacuum filtered using a 0.2-μm PES filter assembly (Nalgene) to remove the catalyst particles. The solutions were blown down overnight in flowing $N_2$ at room temperature to remove the solvent, and the solid dicarboxylic acid product was analyzed by ICP-MS to determine extent of palladium leaching.

Results.

Table 2 compares some basic material properties of thermally aged uncoated Pd/$TiO_2$ catalysts to Pd/$TiO_2$ catalysts coated with $Al_2O_3$ five ALD cycles. Thermal aging was performed at 700° C. under 200 sccm air for 4 hours followed by 200° C. under 200 sccm $H_2$ for 4 hours. Thermal treatment of the uncoated catalysts resulted in a collapse of the catalyst pore network and restricted access to active metal sites, as illustrated by the reduction in surface area, pore volume, and CO uptake. A corresponding increase in the average pore radius was also observed. In contrast, the data collected on the $Al_2O_3$-coated catalyst indicates that the impact of thermally-induced pore collapse are minimized.

TABLE 2

Thermal Aging Study Results.

| Parameter | Fresh Uncoated | Aged Uncoated | Fresh 5-cycle | Aged 5-cycle |
|---|---|---|---|---|
| Surface area ($m^2\ g^{-1}$) | 130 | 22 | 126 | 96 |
| Pore volume (mL $g^{-1}$) | 0.58 | 0.24 | 0.51 | 0.46 |
| Pore radius (nm) | 5.9 | 16.4 | 5.6 | 7.2 |
| CO uptake (µmol $g^{-1}$) | 25 | 5 | 14 | 25 |

Figure 4:
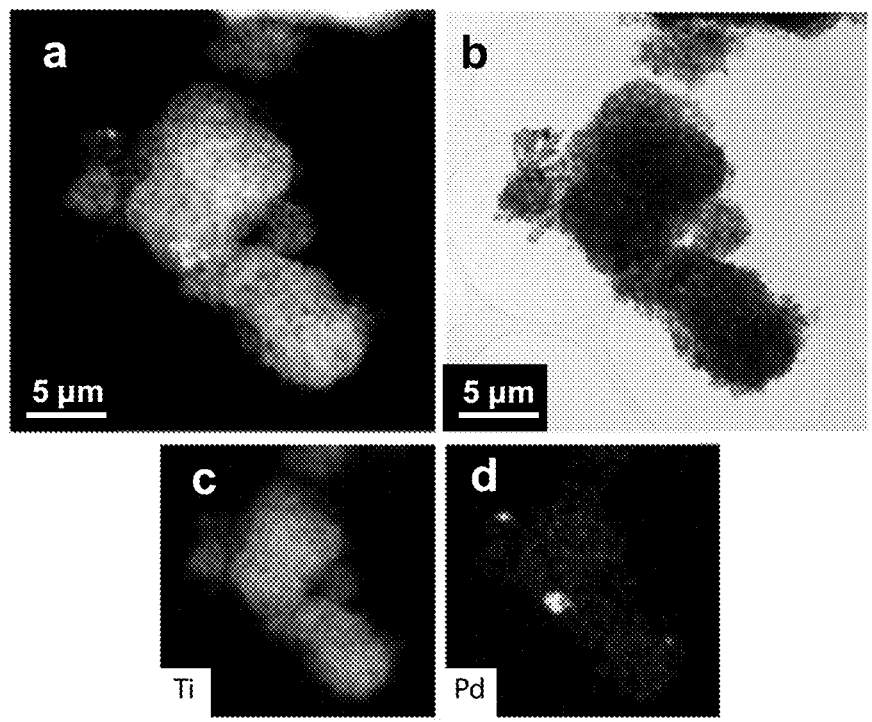
FIG. 4 illustrates STEM images and STEM-EDS maps of uncoated $Pd/TiO_2$ particles and $Pd/TiO_2$ coated with $Al_2O_3$ by 5-cycles of ALD after thermal treatment at 700° C., according to some embodiments of the present disclosure.
Figure 4:
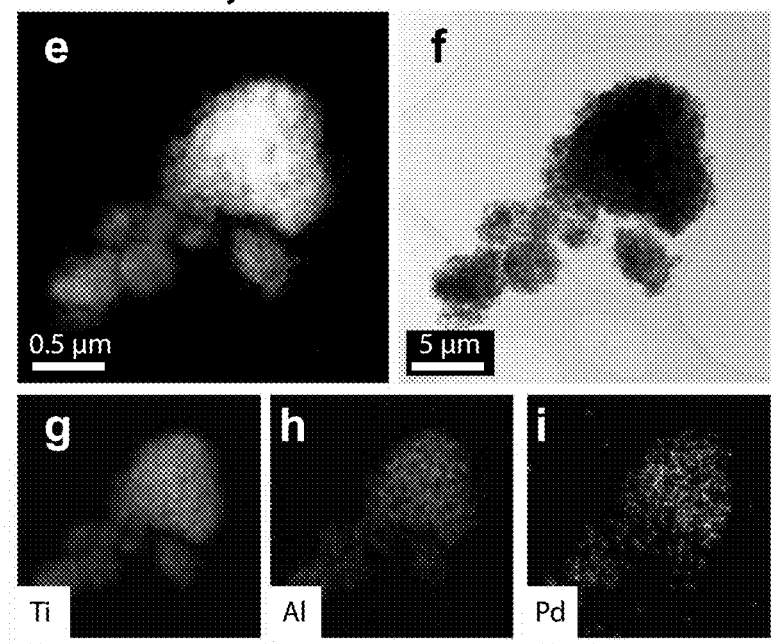

FIG. 4 illustrates STEM images and STEM-EDS maps of uncoated Pd/TiO$_2$ particles and Pd/TiO$_2$ coated with Al$_2$O$_3$ by 5-cycles of ALD after thermal treatment at 700° C. Panels a-d of FIG. 4 show uncoated Pd/TiO$_2$ with dramatic sintering of Pd nanoparticles. Panels e-i of FIG. 4 show that Pd/TiO$_2$ coated with Al$_2$O$_3$ by 5-cycles of ALD display highly disperse Al and Pd. It is evident by these images that the 5-cycle Al$_2$O$_3$ ALD coating imparted resistance to sintering of the Pd nanoparticles under harsh oxidative thermal treatment at 700° C.

Figure 5:
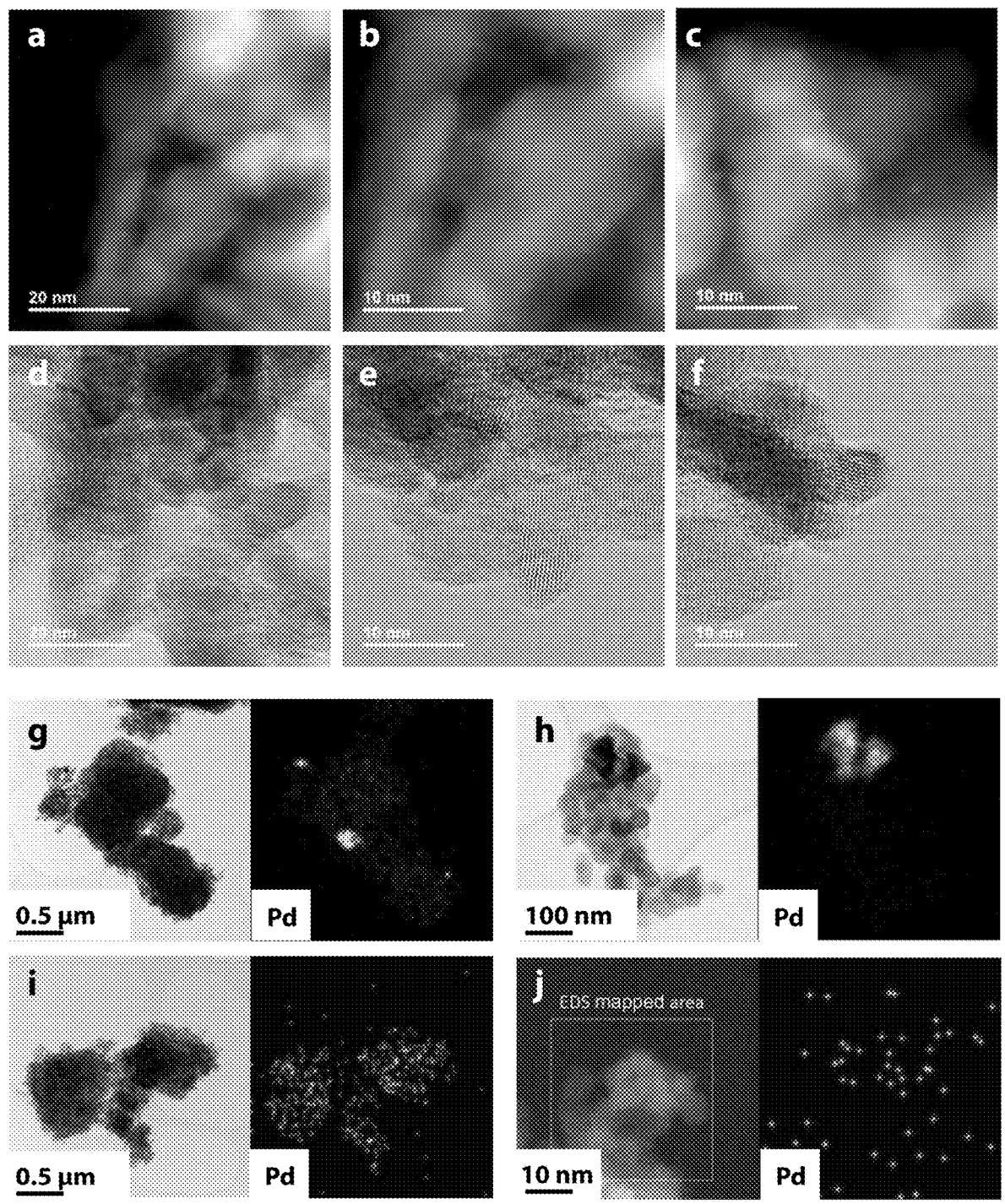
FIG. 5: Panels a-c show STEM images and STEM-EDS maps illustrating the small (less than 2 nm) Pd particles on the $Pd/TiO_2$ catalyst coated with $Al_2O_3$ by 5-cycles of ALD; Panels g-h illustrate the agglomeration of Pd particles on the 700° C. treated uncoated $Pd/TiO_2$ catalyst; and Panels i and j illustrate the retained dispersion of Pd particles on the 700° C. treated $Pd/TiO_2$ catalyst coated with $Al_2O_3$ by 5-cycles of ALD, according to some embodiments of the present disclosure.

Panels a-c of FIG. 5 show STEM images and STEM-EDS maps illustrating the small (less than 2 nm) Pd particles on the Pd/TiO$_2$ catalyst coated with Al$_2$O$_3$ by 5-cycles of ALD. Panels d-f of FIG. 5 illustrate the thin, amorphous Al$_2$O$_3$ coating visible on the fresh Pd/TiO$_2$ catalyst coated with the Al$_2$O$_3$ by 5-cycles of ALD. Panels g-h of FIG. 5 illustrate the severe agglomeration of Pd particles on the 700° C. treated uncoated Pd/TiO$_2$ catalyst. Panels i and j of FIG. 5 illustrate the retained dispersion of Pd particles on the 700° C. treated Pd/TiO$_2$ catalyst coated with Al$_2$O$_3$ by 5-cycles of ALD. These images and elemental maps underscore that the application of a thin Al$_2$O$_3$ coating to the Pd/TiO$_2$ catalyst by ALD resulted in hindrance to Pd nanoparticle sintering under conditions at which Pd typically agglomerates readily.

Figure 6:
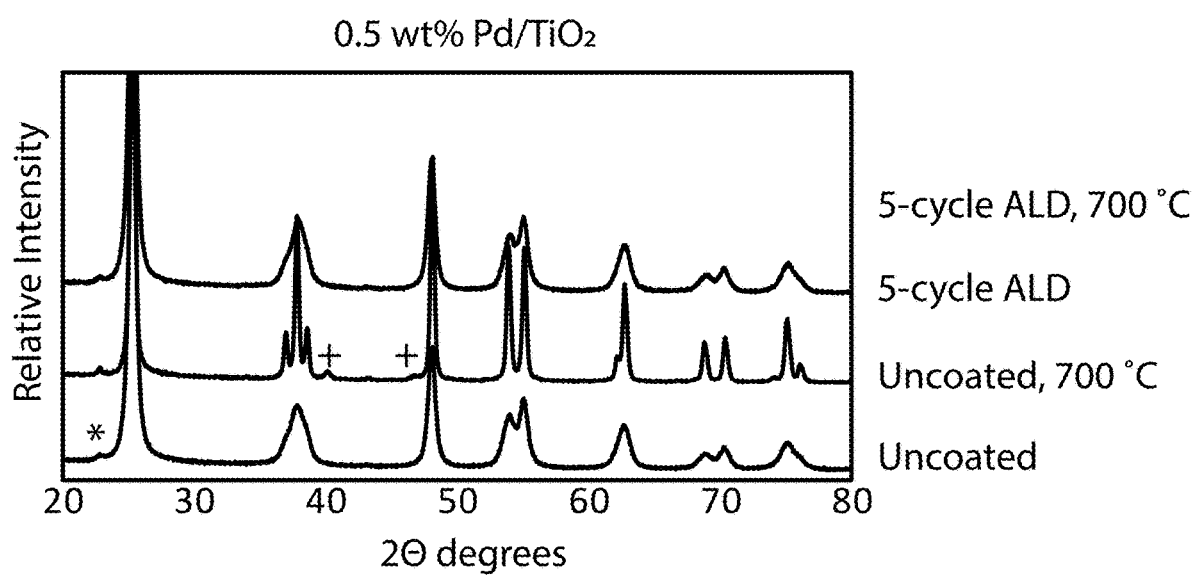
FIG. 6 illustrates XRD patterns of fresh and 700° C. treated uncoated 0.5 wt % $Pd/TiO_2$ and XRD spectra of fresh and 700° C. treated $Pd/TiO_2$ catalyst coated with $Al_2O_3$ by 5-cycles of ALD, according to some embodiments of the present disclosure.
Figure 7A:
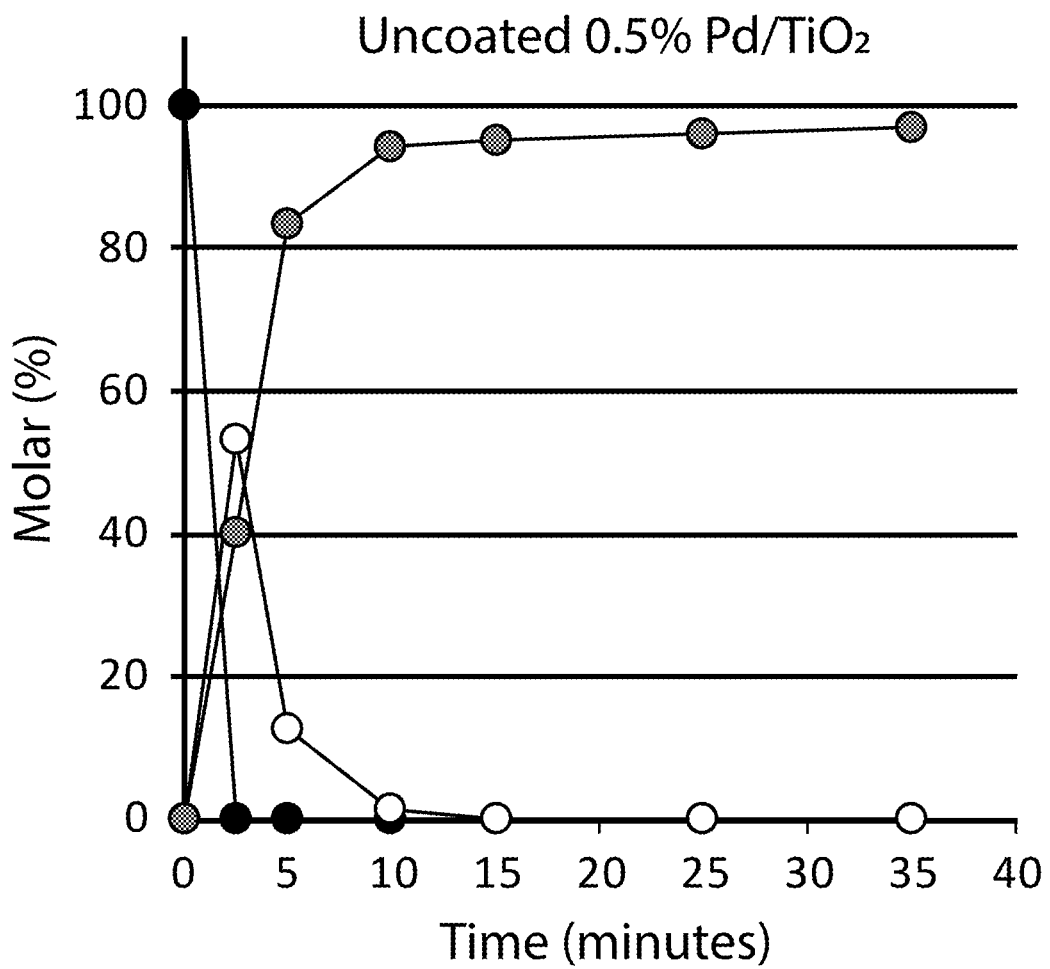
FIGS. 7A-7D illustrate batch reactor muconic acid hydrogenation activity comparisons between fresh and 700° C. treated uncoated 0.5 wt % $Pd/TiO_2$ and $Pd/TiO_2$ catalyst coated with $Al_2O_3$ by 5-cycles of ALD, according to some embodiments of the present disclosure.
Figure 7B:
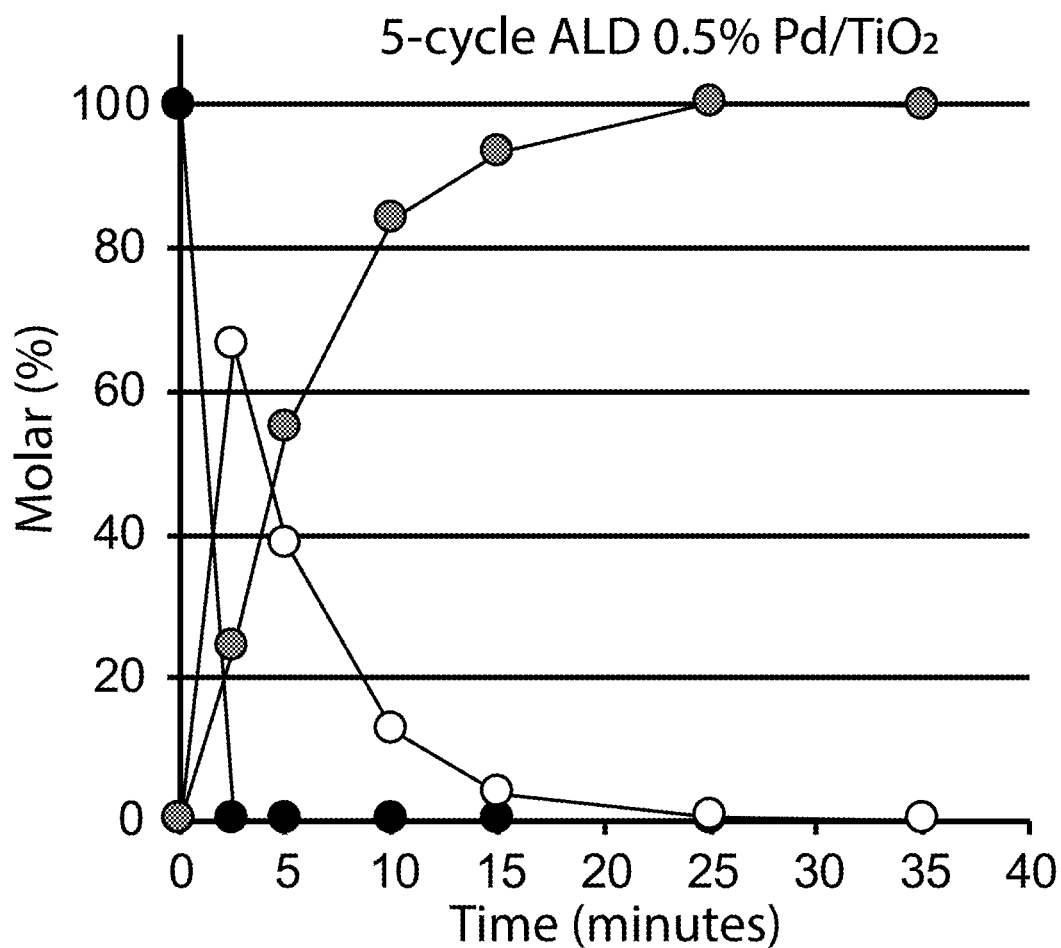
Figure 7C:
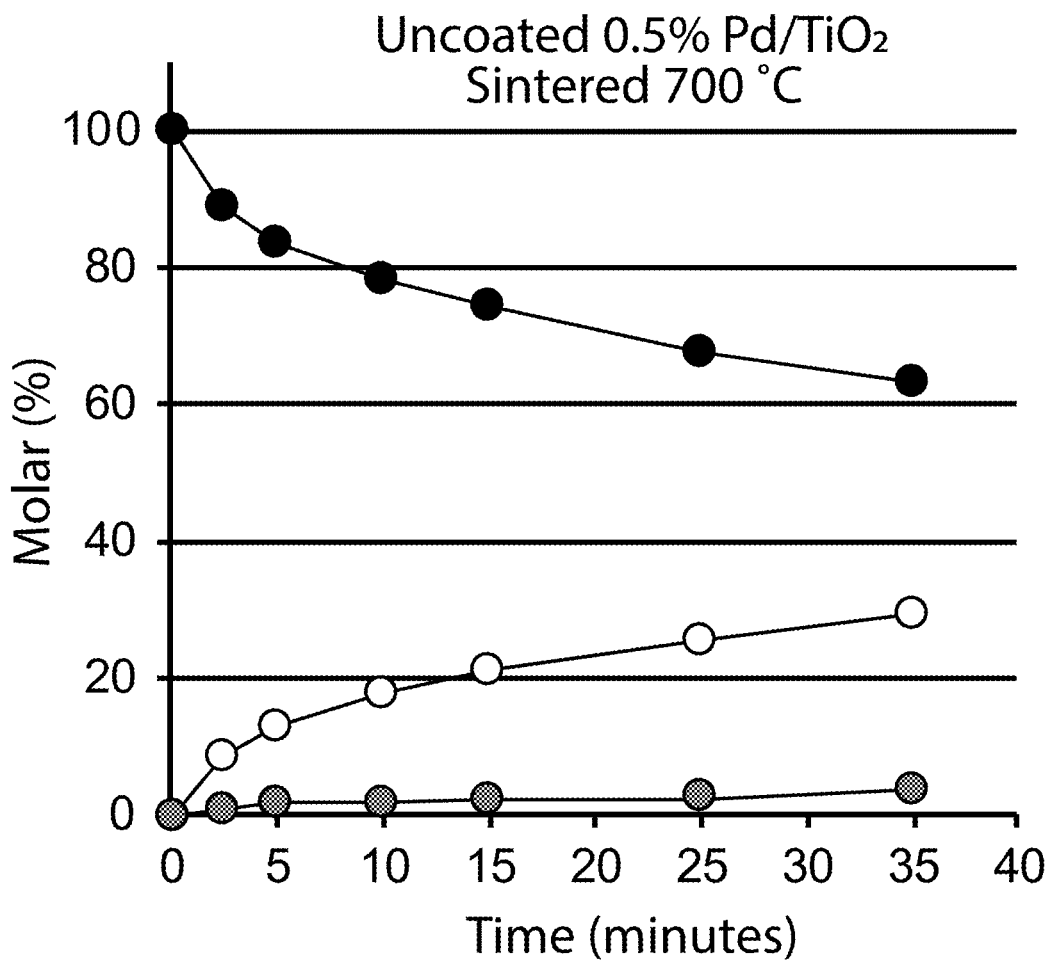
Figure 7D:
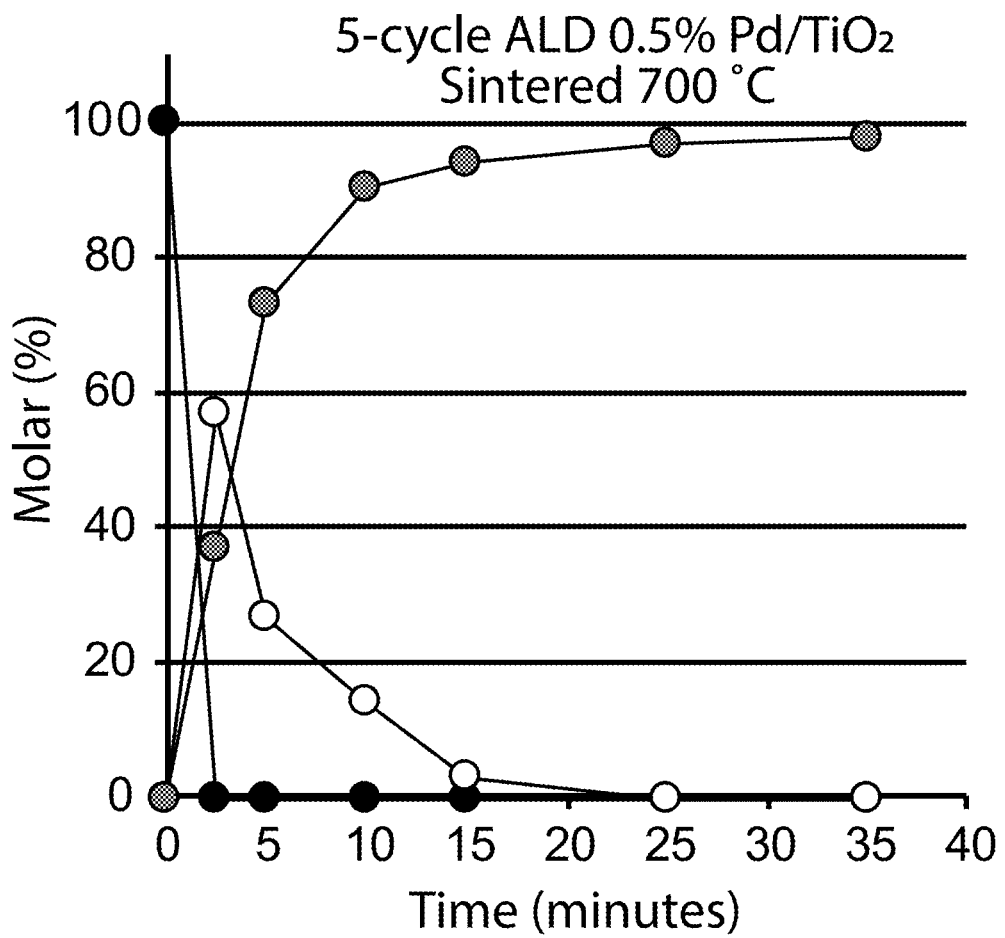

FIG. 6 provides XRD patterns of fresh and 700° C. treated uncoated 0.5 wt % Pd/TiO$_2$ and XRD spectra of fresh and 700° C. treated Pd/TiO$_2$ catalyst coated with Al$_2$O$_3$ by 5-cycles of ALD. The narrowing of the peaks in the XRD pattern from the 700° C. treated uncoated 0.5 wt % Pd/TiO$_2$ as compared to the XRD pattern of the fresh uncoated Pd/TiO$_2$ catalyst indicates that the anatase TiO$_2$ support has undergone morphological changes during the 700° C. thermal treatment. The consistency in the XRD patterns of the fresh and 700° C.-treated ALD-coated Pd/TiO$_2$ indicates that the Al$_2$O$_3$ ALD coating has increased resistance of the TiO$_2$ to undergo structural changes when exposed to the 700° C. oxidative environment. The asterisk marks the location of Cu Kβ while the + symbol marks the location of palladium peaks.

FIGS. 7A-7D illustrate batch reactor muconic acid hydrogenation activity comparisons between fresh and 700° C. treated uncoated 0.5 wt % Pd/TiO$_2$ and Pd/TiO$_2$ catalyst coated with Al$_2$O$_3$ by 5-cycles of ALD. The decline in muconic acid hydrogenation activity of the 700° C. treated uncoated Pd/TiO$_2$ reflects the detrimental structural modifications that catalyst experienced during thermal treatment (e.g. Pd sintering and TiO$_2$ restructuring).

Figure 8:
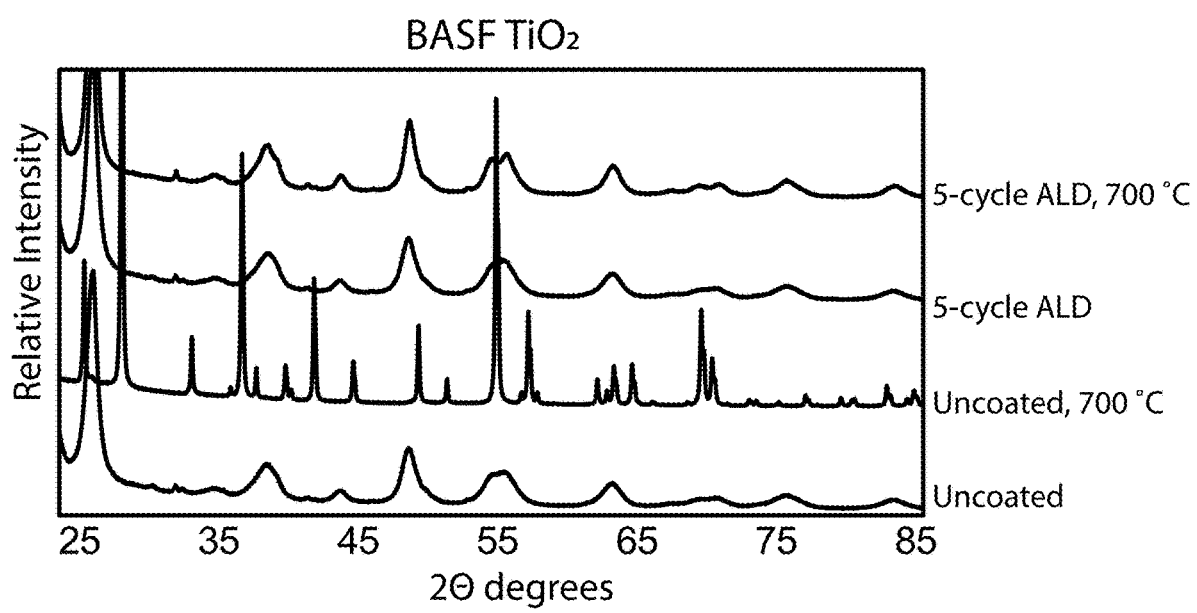
FIG. 8 illustrates XRD pattern of fresh and thermally-aged uncoated $TiO_2$ obtained from BASF and the same support coated with $Al_2O_3$ by five cycles of ALD, according to some embodiments of the present disclosure.

In addition, TiO$_2$ which had not been loaded with Pd was coated with Al$_2$O$_3$ using ALD. FIG. 8 illustrates XRD pattern of fresh and thermally-aged uncoated TiO$_2$ obtained from BASF and the same support coated with Al$_2$O$_3$ by five cycles of ALD. Thermal aging studies were performed at a temperature of 700° C. under 200 sccm air for 4 hours followed by 200° C. under 200 sccm H$_2$ for 4 hours. The narrowing of the peaks in the XRD pattern from the 700° C. treated uncoated 0.5 wt % Pd/TiO$_2$ as compared to the XRD pattern of the fresh uncoated Pd/TiO$_2$ catalyst provides further evidence that anatase TiO$_2$ materials can undergo morphological changes during thermal treatments at 700° C. Moreover, the appearance of additional peaks on the 700° C. treated uncoated 0.5 wt % Pd/TiO$_2$ (e.g. note the clear peak at about 27-28°) indicate that phase change from anatase to rutile has occurred. Conversely, no peak-narrowing or phase change is apparent in the XRD spectrum of the 700° C.-treated ALD-coated Pd/TiO$_2$, highlighting the improved stability of the coated materials. Table 3 summarizes physical properties of these thermally aged materials. Thermal treatment of the uncoated catalysts resulted in a collapse of the catalyst pore network, as illustrated by the significant reduction in surface area and pore volume. A corresponding increase in the average pore radius was also observed. In contrast, the Al$_2$O$_3$-coated material exhibits improved resistance to thermally-induced pore collapse than the uncoated material.

TABLE 3

Physical Properties of Thermally Aged TiO$_2$, with and without Al$_2$O$_3$ coating (BASF)

| Parameter | Fresh Uncoated | Aged Uncoated | Fresh 5-cycle | Aged 5-cycle |
|---|---|---|---|---|
| Surface area ($m^2\ g^{-1}$) | 129 | 9 | 102 | 64 |
| Pore volume (mL $g^{-1}$) | 0.37 | 0.10 | 0.32 | 0.27 |
| Pore diameter (nm) | 3.8 | 29.1 | 3.8 | 6.1 |

Figure 9:
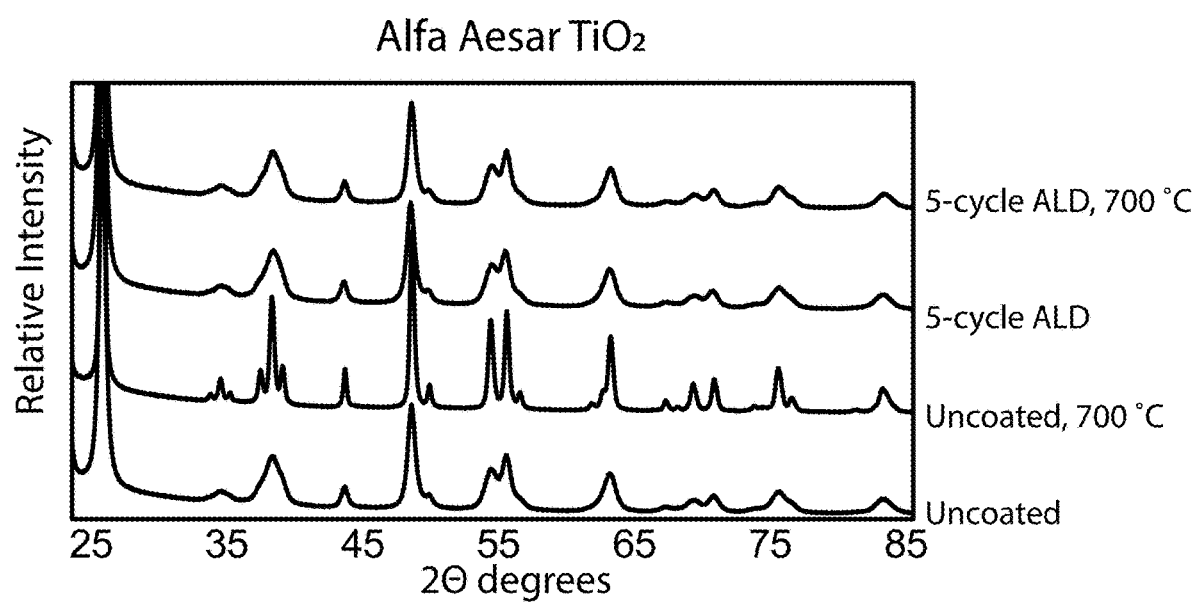
FIG. 9 illustrates XRD spectra of fresh and heat treated (e.g. thermally aged) uncoated $TiO_2$ obtained from Alfa Aesar and the same support with a coating of $Al_2O_3$ applied by ALD, according to some embodiments of the present disclosure.

FIG. 9 illustrates XRD spectra of fresh and heat treated (e.g. thermally aged) uncoated TiO$_2$ obtained from Alfa Aesar and the same support with a coating of Al$_2$O$_3$ applied by ALD. Table 3 summarizes physical properties of these thermally aged materials. Thermal aging studies were performed at a temperature of 700° C. under 200 sccm air for 4 hours followed by 200° C. under 200 sccm H$_2$ for 4 hours. The consistency between FIG. 9 and FIG. 6, as well as Table 4 and Table 2, indicates that ALD coatings can improve resistance to morphological changes and pore collapse in TiO$_2$ regardless of the presence of a metal (e.g., Pd) on the material, further highlighting the potential broad impacts of this advancement in the state of technology.

TABLE 4

Physical Properties of Thermally Aged TiO$_2$, with and without Al$_2$O$_3$ coating

| Parameter | Fresh Uncoated | Aged Uncoated | Fresh 5-cycle | Aged 5-cycle |
|---|---|---|---|---|
| Surface area ($m^2\ g^{-1}$) | 142 | 34 | 122 | 96 |
| Pore volume (mL $g^{-1}$) | 0.53 | 0.25 | 0.45 | 0.43 |
| Pore diameter (nm) | 4.9 | 22.9 | 2.0 | 6.2 |

Results Data Set #2: Palladium Active Material on TiO$_2$ Core, Coated with Al$_2$O$_3$ by Fluidized-Bed ALD—Thermal Aging and Muconic Acid to Adipic Acid Conversion In this set of experiments, Al$_2$O$_3$ (less than 5 wt % aluminum) coatings were applied to TiO$_2$ cores have palladium active material deposited between the coatings and the cores. As shown herein, these catalysts demonstrated increased durability during continuous hydrogenation of muconic acid to adipic acid. Initial coating development and detailed characterization were performed on the milligram-scale using stop-flow ALD. Subsequently, the ALD coating production scale was increased by up to three orders of magnitude using fluidized bed ALD, resulting in even better leaching tolerance and higher steady state activity for muconic acid hydrogenation than the catalysts produced using stop-flow ALD.

In stop-flow mode, the reactor is isolated from the pump during the exposure to the precursor. The pump is opened either after the exposure of the precursor, or after a defined exposure time. The precursors were trimethylaluminum (TMA) and water, both of which were held in vessels at room temperature. "Dose" is defined as the time that the precursor is introduced into the reactor. "Exposure" is defined as the time in which the precursor dwells inside the reactor after the dose. "Purge" if defined as the time to remove the precursor from the reactor via flowing carrier gas. "Evacuate" is defined as the time to remove the precursor from the reactor with vacuum and no flowing carrier gas.

ALD in a fluidized bed uses gas flow to suspend the catalyst substrate material during deposition. While the particles are suspended, precursors are dosed into the same gas flow in a similar sequential manner as described above. The sample is held in a reactor vessel where the bottom is a porous material that allows the gas and ALD precursors to pass through while the catalyst substrates remain in the vessel. The suspension of catalyst substrate particles can enable more uniform coatings as point-to-point contacts with the catalysts are minimized and ALD precursors are given better access to the complete particle surface area.

Initial studies were performed using stop-flow mode ALD to coat about 100-mg of catalyst. Advanced characterization of the ALD-coated catalyst was used to identify the presence of coating and Pd within the support pore structure. Based on the promising results obtained at the 100-mg scale for leaching resistance and catalytic activity, the catalyst was scaled up to 10 g used a fluidized bed ALD method to evaluate tradeoffs with stop-flow versus fluidized bed ALD. Due to the propensity for carbon fouling with muconic acid, catalyst regeneration and thermal stability against Pd sintering and $TiO_2$ support collapse were rigorously evaluated using the 100 mg and 10 gram scale materials. The ALD coating scale was then increased further to 100 grams to confirm transferable material properties, performance, and durability during scale-up using the fluidized bed ALD method.

Palladium Leaching with Muconic Acid.

First, experiments were used to investigate Pd leaching with common biobased oxygenates. An uncoated 0.5 wt % Pd/$TiO_2$ catalyst (palladium active material on a $TiO_2$ core) was exposed to several carboxylic acid and furan oxygenates under relevant biomass processing conditions (see Table 5). Testing conditions: 15 mg catalyst, 20 mL specified concentration in ethanol, 24° C., 24 bar $H_2$, stirring at 1600 rpm. Note, muconic acid is the cis, cis isomer.

TABLE 5

Pd leaching from uncoated 0.5 wt % Pd/$TiO_2$ upon exposure to various oxygenates

| Oxygenate | Conc. | Temp. | Pd leaching |
| --- | --- | --- | --- |
| Furfural | 1% | 24° C. | 0.31 ± 0.01 ppm |
| Hexanoic acid | 1% | 24° C. | 1.20 ± 0.70 ppm |
| Adipic acid | 1% | 24° C. | 3.39 ± 1.05 ppm |
| Muconic acid | 1% | 24° C. | 6.09 ± 0.10 ppm |

Figure 10A:
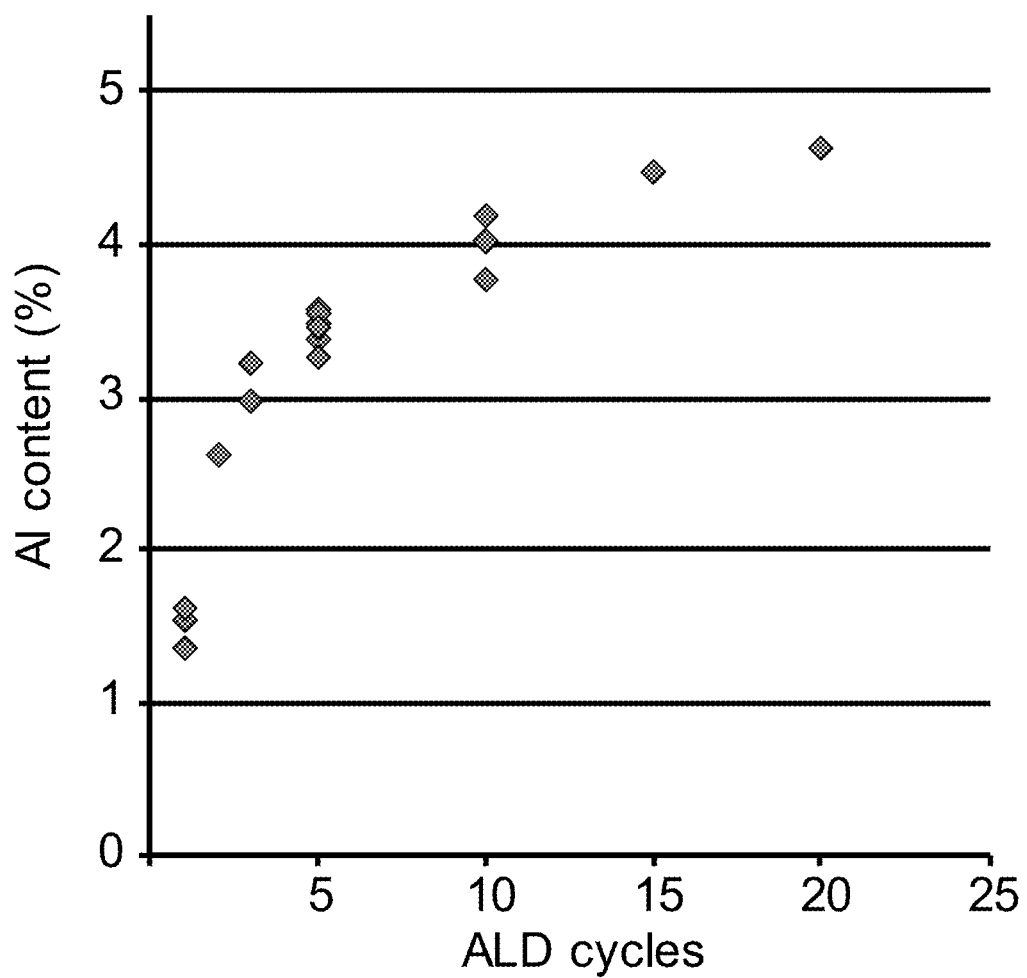
FIG. 10A illustrates the change in aluminum content present in an $Al_2O_3$ coating as a result of number of ALD cycles, according to some embodiments of the present disclosure.
Figure 10B:
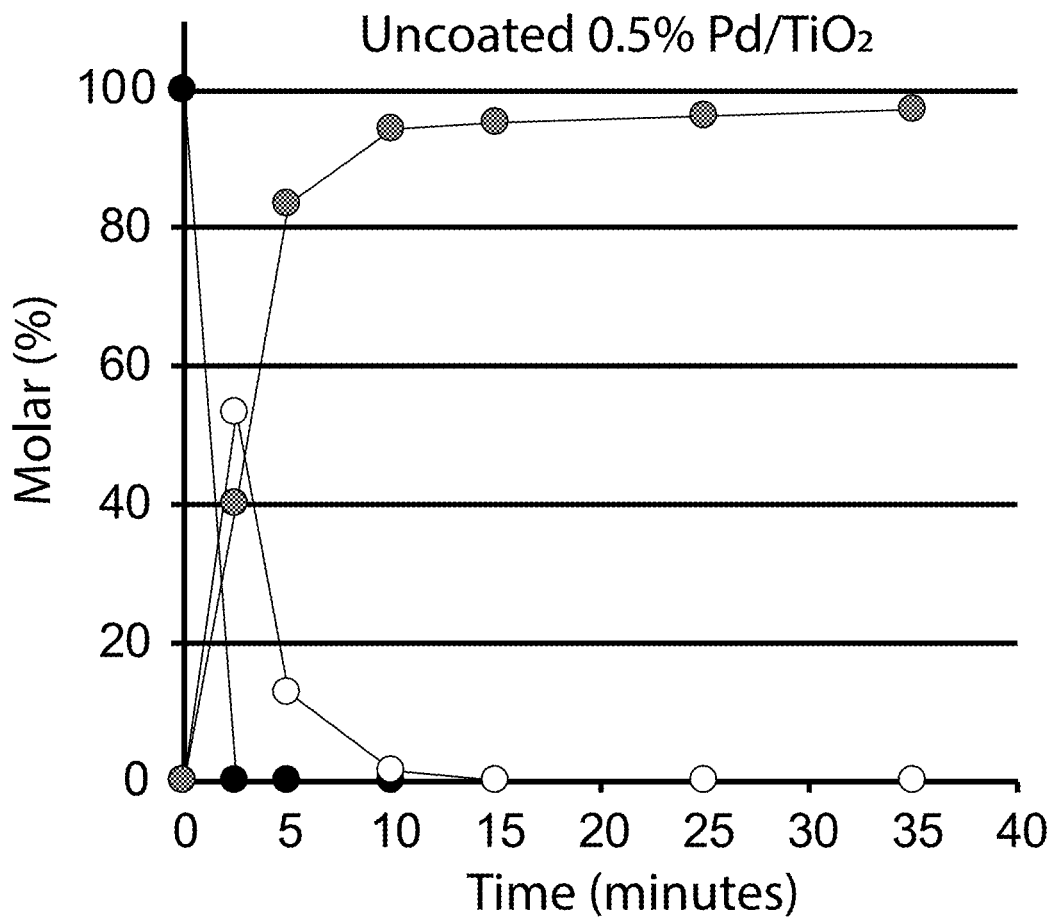
FIGS. 10B-10E illustrate catalyst activity as a function of time on stream for various ALD-coated compositions, according to some embodiments of the present disclosure.
Figure 10C:
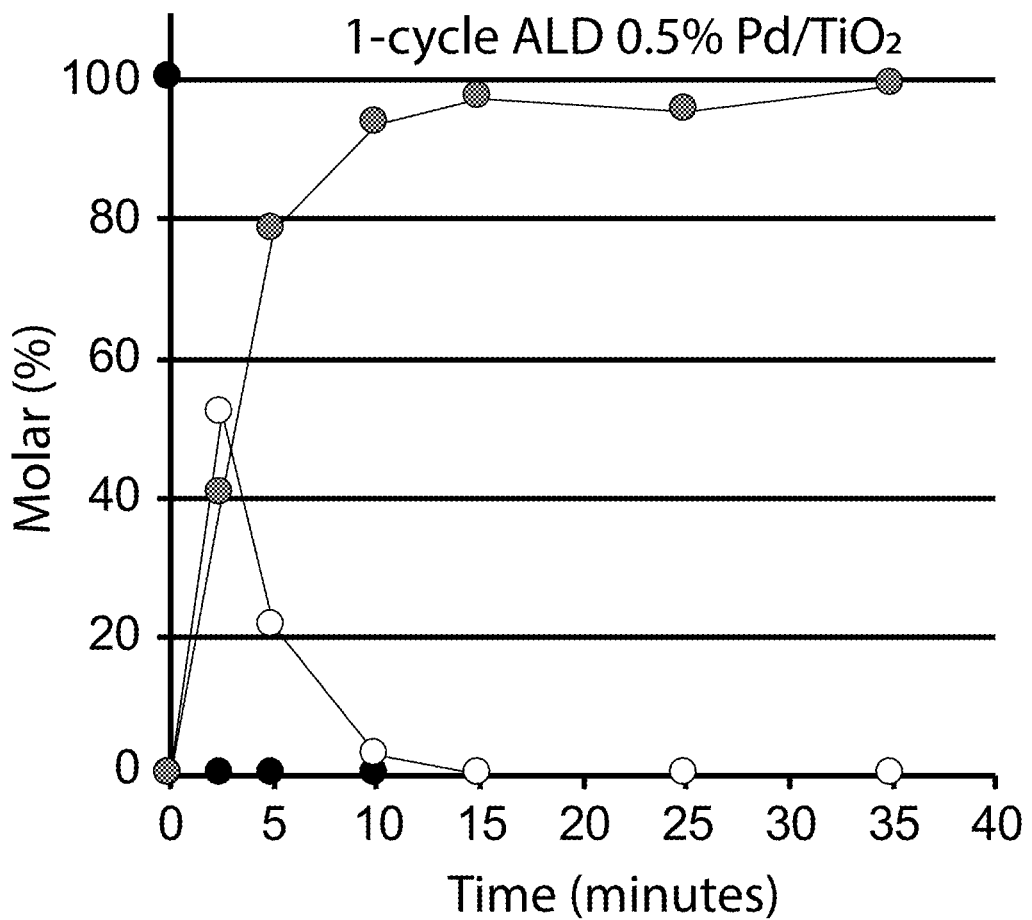
Figure 10D:
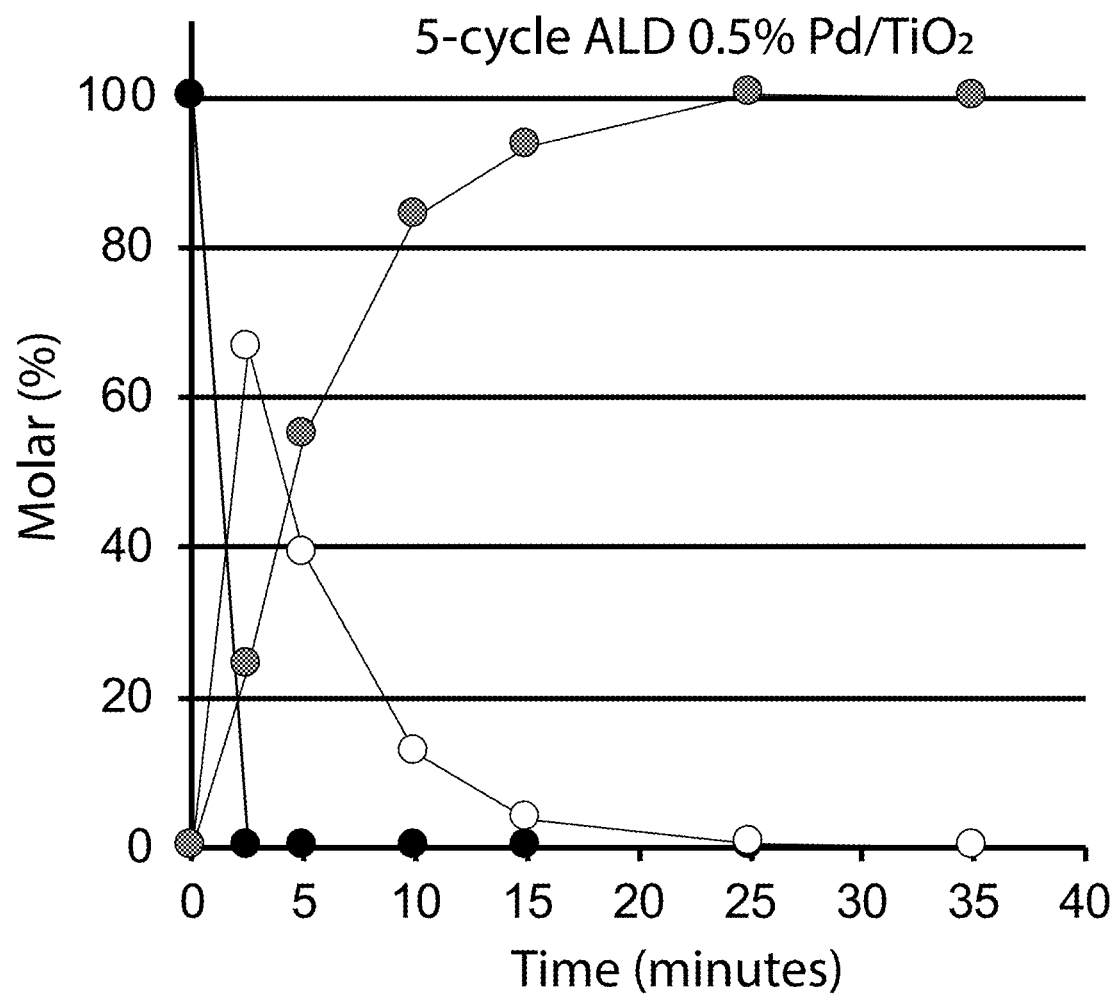
Figure 10E:
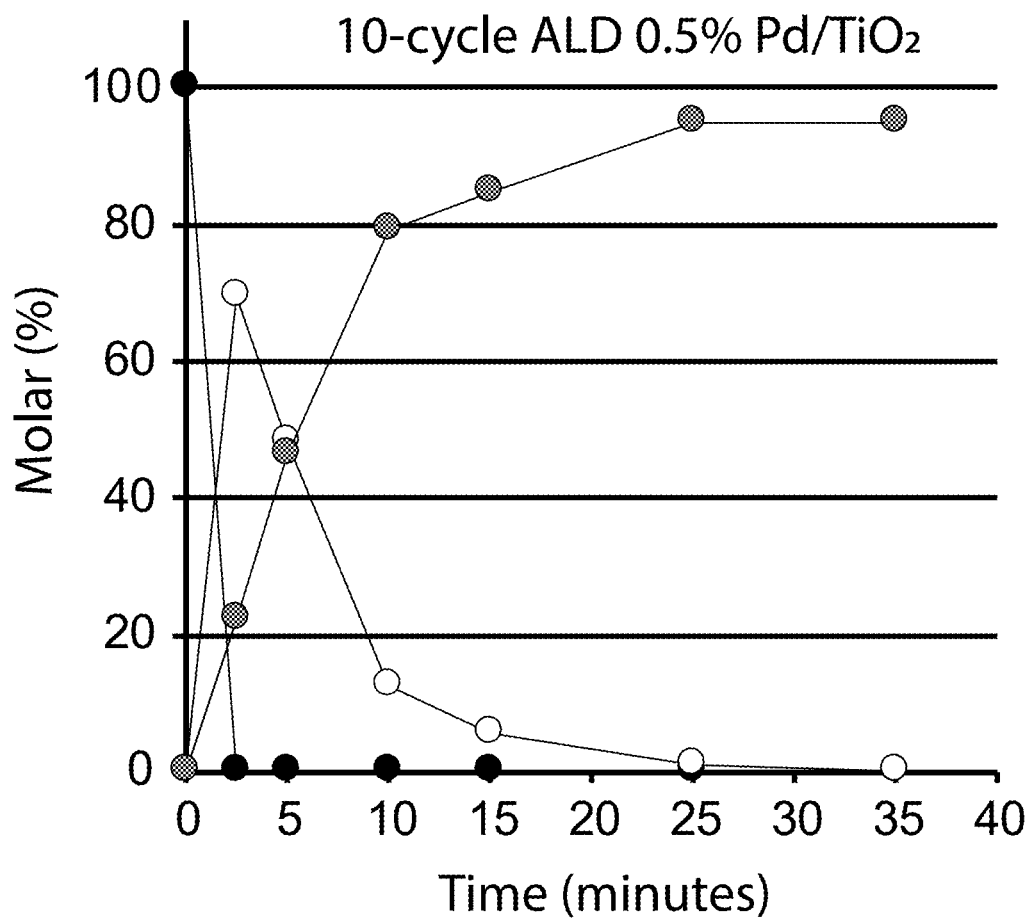

For this work, anatase $TiO_2$ was chosen as the catalyst support (i.e. core) based on preliminary muconic acid hydrogenation tests which revealed that 1 wt % Pd/$TiO_2$ exhibited higher adipic acid productivity and comparable leaching to 1 wt % Pd supported on other common catalyst supports. Of the oxygenates screened, exposure to 0.5 wt % muconic acid at 24° C. resulted in the most Pd leaching, with 6.09±0.10 ppm of Pd leached into the dicarboxylic acid product mixture, which was more than twice the Pd leaching exhibited by any other oxygenate tested. In this disclosure, all leaching values are reported in ppm and are measured as mg of Pd per kg of dried solid acid product mixture. The extent of Pd leaching observed with muconic acid (greater than 5 ppm Pd in dicarboxylic acid) translates to a projected catalyst lifetime of less than 1 year, which may be considered unacceptably short for industrial processes To evaluate thin ALD coatings for improving the durability of 0.5 wt % Pd/$TiO_2$ against leaching by muconic acid, a series of $Al_2O_3$ coatings were applied to 100 mg of the 0.5 wt % Pd/$TiO_2$ catalyst using stop-flow mode ALD and screened for both catalytic activity and Pd leaching in muconic acid hydrogenation batch reactions (see FIGS. 10A-10E). Solid black markers correspond to muconic acid concentration; empty markers correspond to hexenedioic acid concentration; and the gray/light markers correspond to adipic acid concentration. The 5 cycle ALD coating with 3.3±0.4 wt % Al was down-selected for continued investigation (see FIG. 10A), henceforth referred to as "100-mg ALD-coated catalyst." Under the stop-flow ALD system parameters in this work (see Table 6), the coating was prepared with 5 ALD cycles using trimethylaluminum (TMA) and $H_2O$ precursors. $N_2$ physisorption and CO chemisorption of the uncoated and 100-mg ALD-coated catalysts (see Table 7), entries 1 and 2) determined that the ALD coating results in a minor reduction in surface area, potentially indicating preferential coating of the exterior surface of the catalyst versus the interior of the pores. The pore volume experienced a reduction of 20%, while the pore diameter decreased by only 4%, suggesting that the ALD coating enters the pore, but does not largely restrict pore accessibility. CO chemisorption revealed lower CO uptake upon ALD coating, indicating reduced accessibility to CO binding sites due to partial coverage by $Al_2O_3$.

Figure 11:
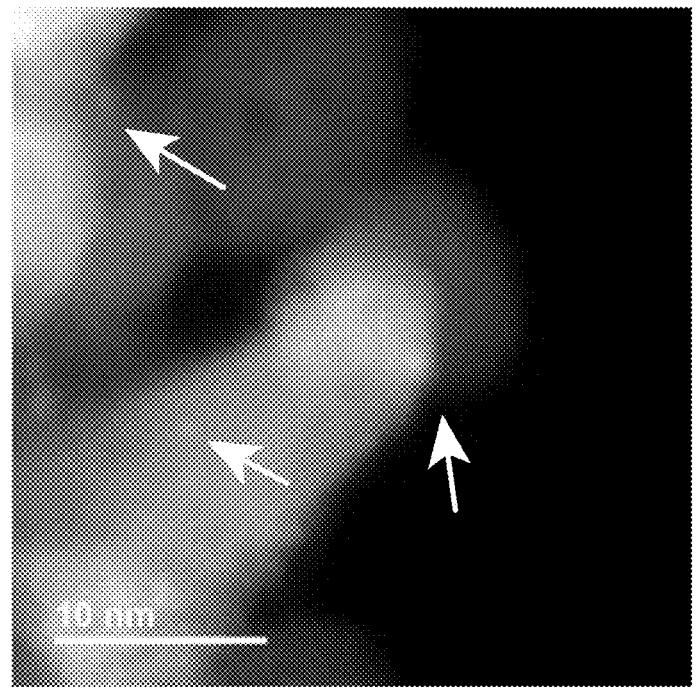
FIG. 11 illustrates STEM-EDS mapping palladium nanoparticles on ALD-coated compositions, according to some embodiments of the present disclosure.
Figure 12:
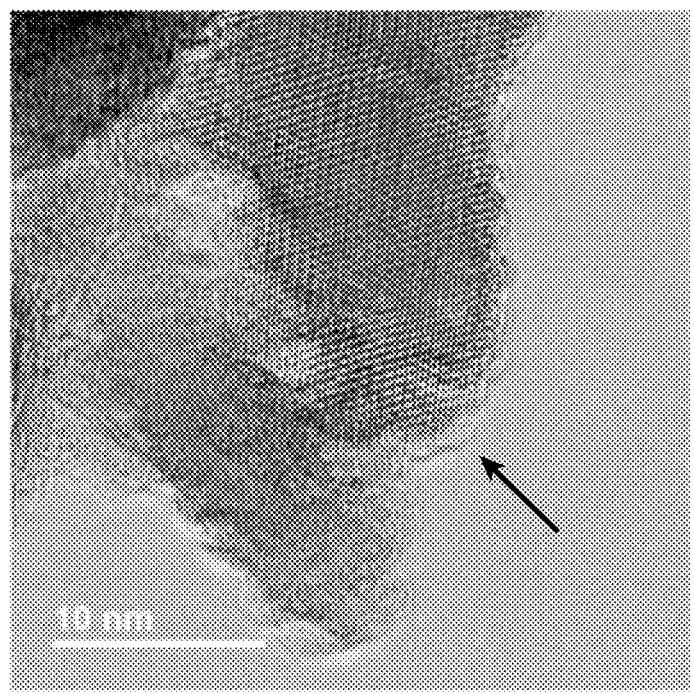
FIG. 12 illustrates BF-STEM imaging of an $Al_2O_3$ coating visible on a catalyst exterior, according to some embodiments of the present disclosure.

To provide more generalized information about the catalyst, such as Pd particle size and distribution as well as the external thickness of the ALD coating, STEM imaging and STEM-EDS mapping were used. On the 100-mg ALD-coated catalyst, highly dispersed Pd nanoparticles (indicated by arrows) were observed with an average measured diameter of 1.14±0.2 nm, consistent with Pd nanoparticles on the uncoated catalyst (see FIG. 11). This suggests that Pd active material dimensions were not altered under the ALD coating conditions and that the decline in hydrogenation activity is likely due to partial Pd coverage by $Al_2O_3$. BF-STEM imaging illustrated the amorphous nature of the $Al_2O_3$ coating visible on the catalyst exterior, which was measured to be 1.17±0.2 nm thick (as indicated by the arrow in FIG. 12).

TABLE 6

Al$_2$O$_3$ ALD coating parameters for Pd/TiO$_2$.

| Precursor | TMA | | | | H$_2$O | | | |
|---|---|---|---|---|---|---|---|---|
| Condition | Dose | Exposure | Purge | Evacuate | Dose | Exposure | Purge | Evacuate |
| Time (sec) | 3 | 80 | 60 | 15 | 3 | 80 | 60 | 15 |
| N$_2$ Flow (sccm) | 200 | 20 | 200 | 0 | 140 | 75 | 200 | 0 |

TABLE 7

Al$_2$O$_3$ ALD coating parameters for Pd/TiO$_2$.

| | Entry No. | | | |
|---|---|---|---|---|
| Parameter | 1 Uncoated | 2 100-mg ALD-coated | 3 10-g ALD-coated | 4 100-g ALD-coated |
| Pd content (wt %) | 0.50 ± 0.03 | 0.47 ± 0.03 | 0.47 ± 0.03 | 0.46 ± 0.02 |
| Al content (wt %) | — | 3.3 ± 0.4 | 2.8 ± 0.3 | 4.4 ± 0.5 |
| ALD coating | None | Stop-flow | Fluidized bed | Fluidized bed |
| Surface area (m$^2$ g$^{-1}$) | 140 ± 13 | 122 ± 2 | 121 ± 3 | 120 ± 2 |
| Pore volume (mL g$^{-1}$) | 0.57 ± 0.05 | 0.46 ± 0.06 | 0.48 ± 0.02 | 0.50 ± 0.05 |
| Pore diameter (nm) | 5.8 ± 0.2 | 5.6 ± 0.1 | 5.8 ± 0.8 | 4.9 ± 0.5 |
| CO uptake (μmol g$^{-1}$) | 24 ± 4 | 14 ± 2 | 13 ± 2 | 11 ± 1 |
| Productivity$_{AA}$ at 2.5 min (s$^{-1}$) | 10.4 ± 0.3 | 10.8 ± 0.3 | 6.7 ± 0.2 | 6.1 ± 0.2 |
| Pd leaching (ppm) | 6.1 ± 0.1 | 2.1 ± 0.3 | 1.2 ± 0.2 | 0.7 ± 0.1 |

Figure 13:
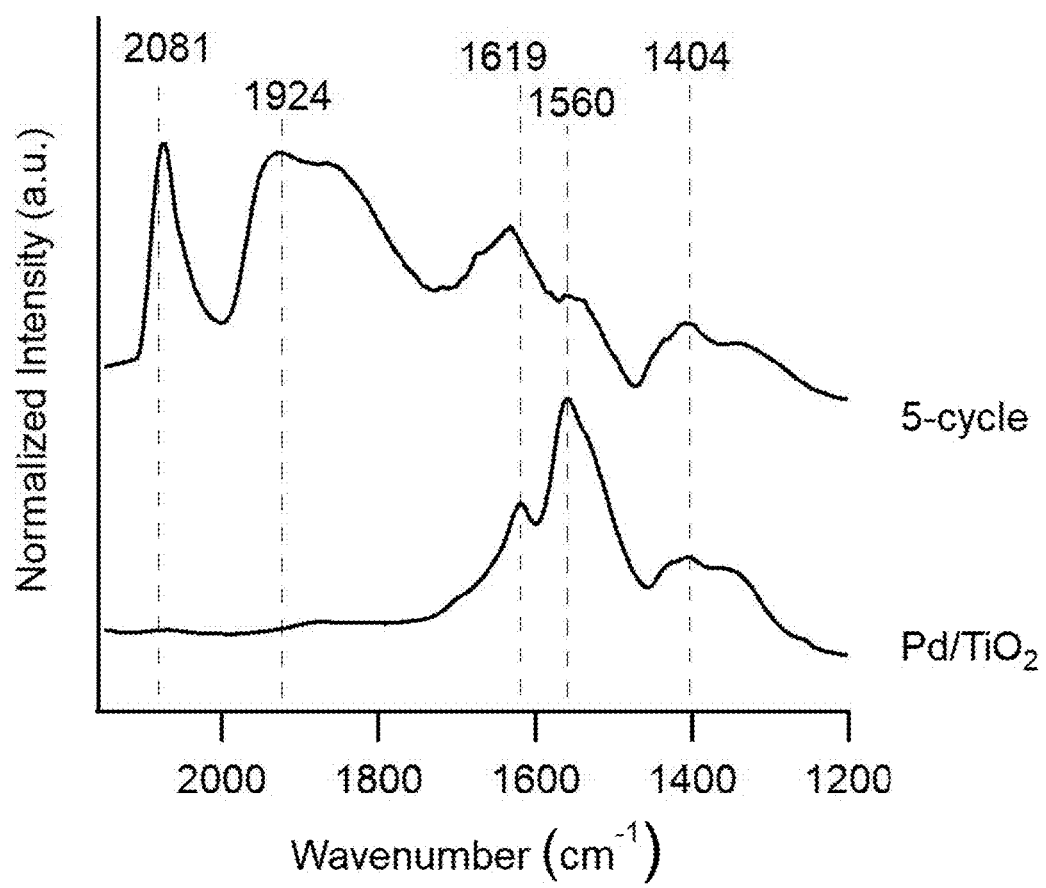
FIG. 13 illustrates diffuse reflectance Fourier transform infrared spectroscopy (DRIFTS) data of ALD-coated compositions, according to some embodiments of the present disclosure.
Figure 14A:
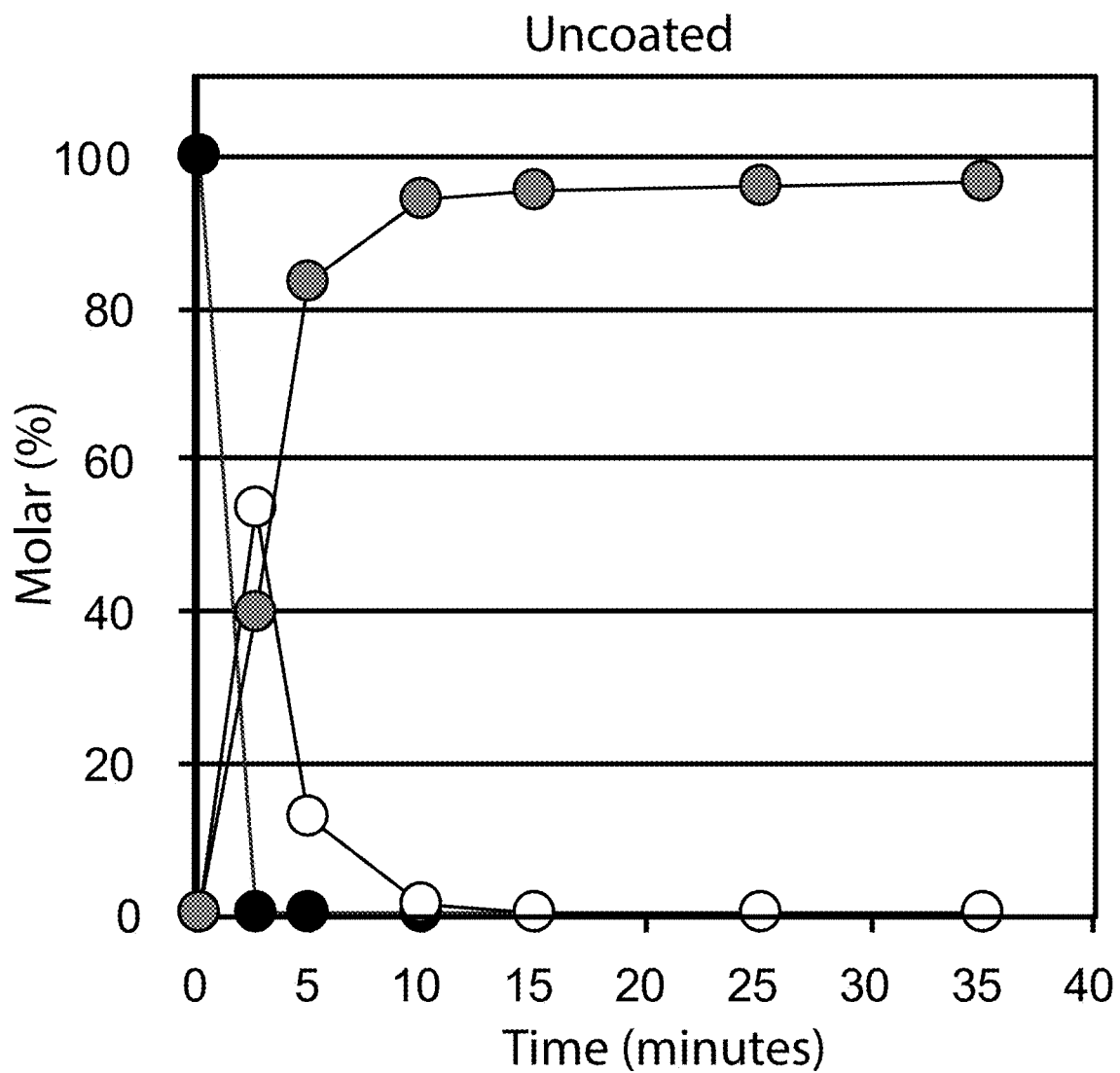
FIGS. 14A-14D illustrate catalytic activity for batch muconic acid hydrogenation reactions of various catalyst compositions, according to some embodiments of the present disclosure.
Figure 14B:
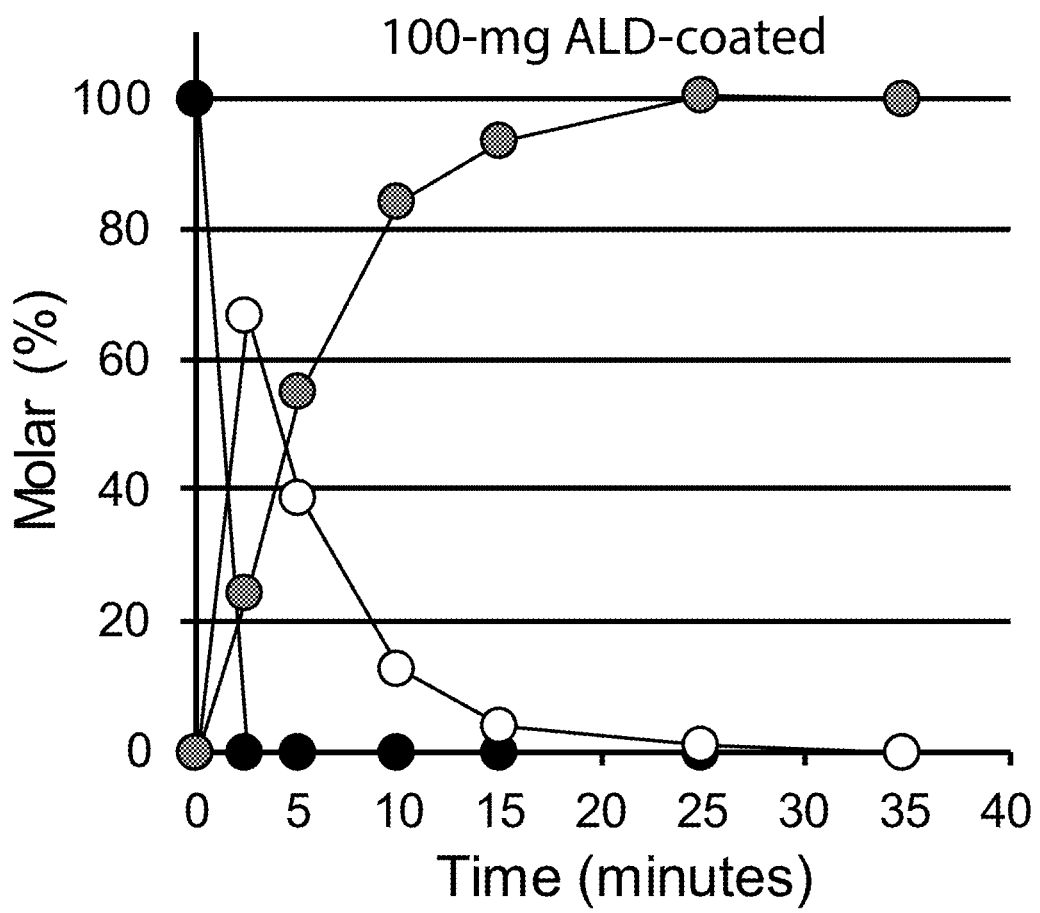
Figure 14C:
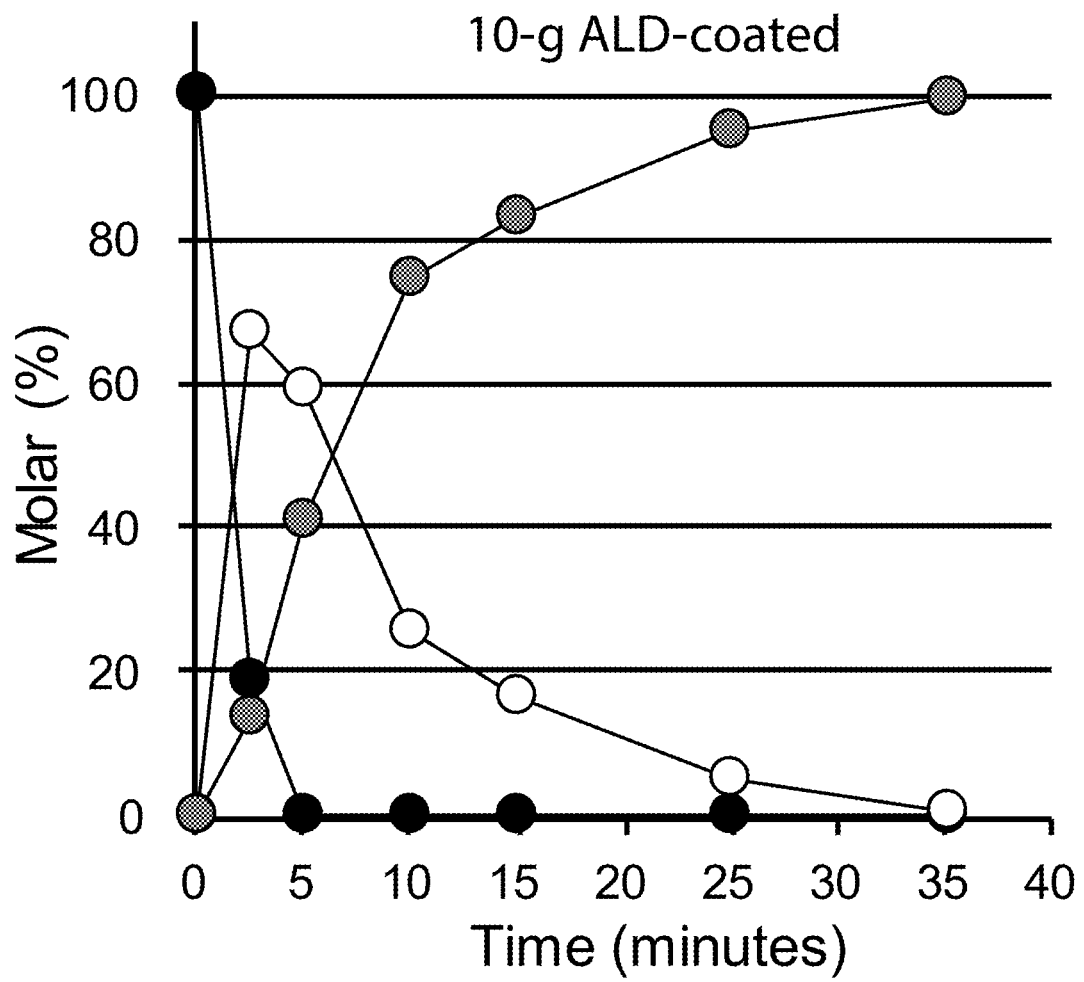
Figure 14D:
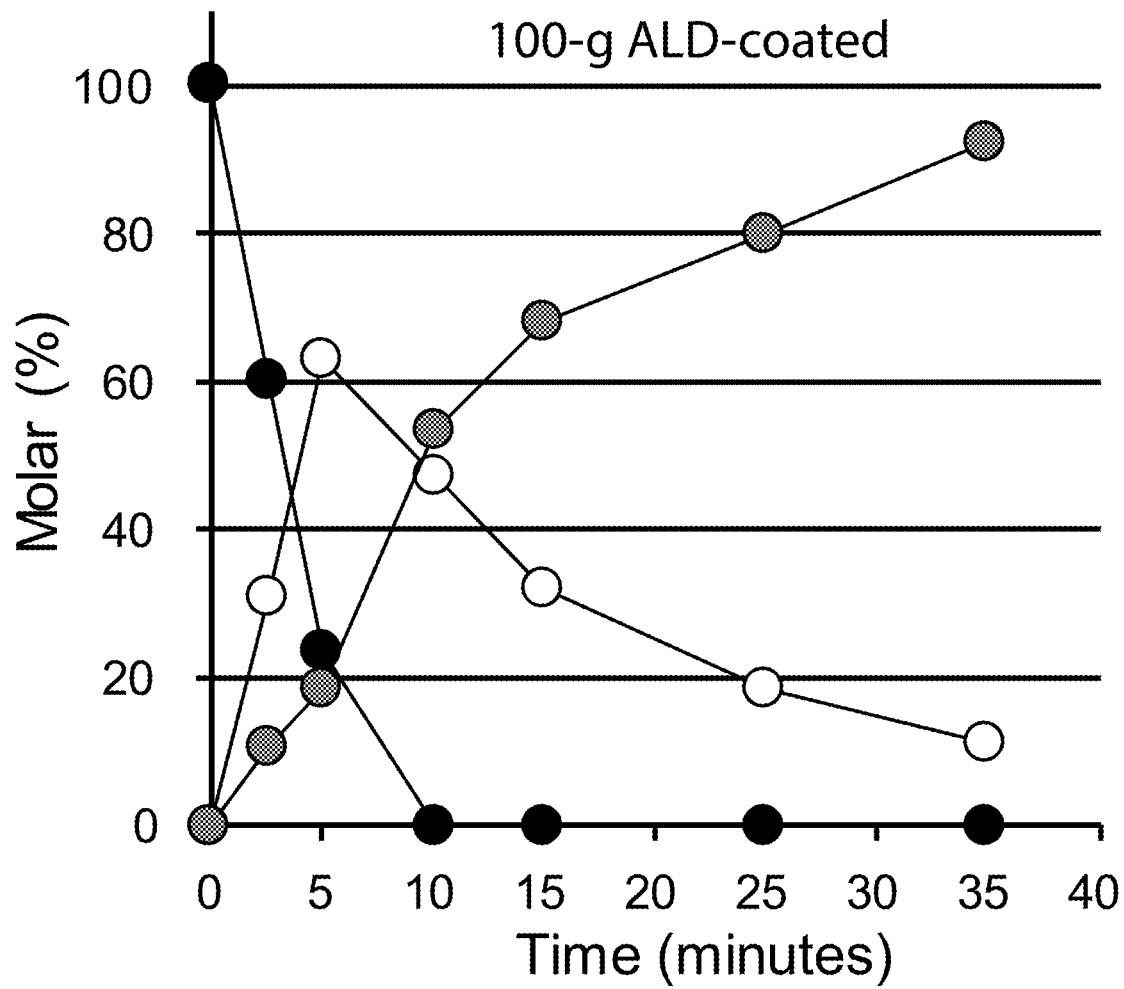

Finally, CO diffuse reflectance Fourier transform infrared spectroscopy (DRIFTS) revealed the mode of interaction of the ALD coating with the catalyst surface. DRIFTS of the uncoated catalyst indicated dominance of CO coordination with the support to form carbonate-like species at 1350-1650 cm$^{-1}$ (see FIG. 13; top data set coated by 5 cycles of ALD; bottom data set uncoated). Upon ALD coating, support-bound peaks decreased in intensity and dominant peaks associated with Pd-bound CO were observed at 1924 cm$^{-1}$ and 2081 cm$^{-1}$. The reduction in support-bound CO is attributed to preferential coverage of the TiO$_2$ support with irreducible Al$_2$O$_3$, leading to a relative increase in CO adsorption on Pd sites.

Scale-Up and Batch Reaction Performance Analysis.

Following investigations with the 100-mg ALD-coated samples prepared using stop-flow ALD, catalyst coatings were scaled by up to three orders of magnitude using fluidized bed ALD to evaluate a path towards commercial relevance. Fluidized bed ALD-coatings were provided by an industry partner, Forge Nano, using the same 0.5 wt % Pd/TiO$_2$ catalyst and target ALD Al$_2$O$_3$ content (3.3±0.4 wt % Al). The scaled-up fluidized bed ALD catalysts were prepared by coating 10 g and 100 g of base catalyst material and are henceforth referred to as "10-g ALD-coated catalyst" and "100-g ALD-coated catalyst," respectively. Upon receipt of the scaled-up ALD-coated catalysts, characterization by N$_2$ physisorption, CO chemisorption, and ICP-MS confirmed that the physicochemical properties of the fluidized bed ALD catalysts were similar to those of the stop-flow ALD catalyst (see Table 7, entries 3 and 4).

The uncoated catalyst and each scale of ALD-coated catalyst was evaluated for catalytic activity and Pd leaching propensity in batch muconic acid hydrogenation reactions (see FIGS. 14A-14D). Solid black markers correspond to muconic acid concentration; empty markers correspond to hexenedioic acid concentration; and the gray/light markers correspond to adipic acid concentration. The productivity of each catalyst (ProdAA) was compared as mmol adipic acid produced per mmol accessible Pd at 2.5 min of reaction (see Table 7). Accessible Pd sites were determined using CO chemisorption, assuming CO:Pd ratio of 1:1. Productivity was reported as a function of adipic acid produced rather than muconic acid converted due to consumption of >50% muconic acid in less than 5 min of reaction across all catalysts. The Pd-normalized adipic acid productivity values revealed that the 100-mg ALD-coated catalyst prepared by stop-flow ALD did not lose activity. Although the 10 gram and 100 g ALD-coated catalysts quantities prepared by fluidized bed ALD experienced a reduction in initial activity, selectivity to adipic acid was preserved.

Despite reductions in initial productivity, all ALD-coated catalysts retained high adipic acid selectivity while reducing Pd leaching by at least 3× and up to 9× during batch reactions (see Table 7). The observed reduction in leaching may be attributed to the preferential binding of TMA to under-coordinated Pd sites that are most susceptible to leaching, which may disrupt the mechanism for muconic acid leaching via chelation across the unsaturated backbone. The theorized basis for improved Pd leaching resistance by the fluidized bed ALD-coated catalysts as compared to the stop-flow ALD-coated catalysts is likely due to increased conformality of ALD coatings applied by the fluidized bed ALD method, which may result in a greater proportion of Pd sites being coated than by stop-flow ALD.

Continuous Flow Reaction Performance Analysis.

Figure 15:
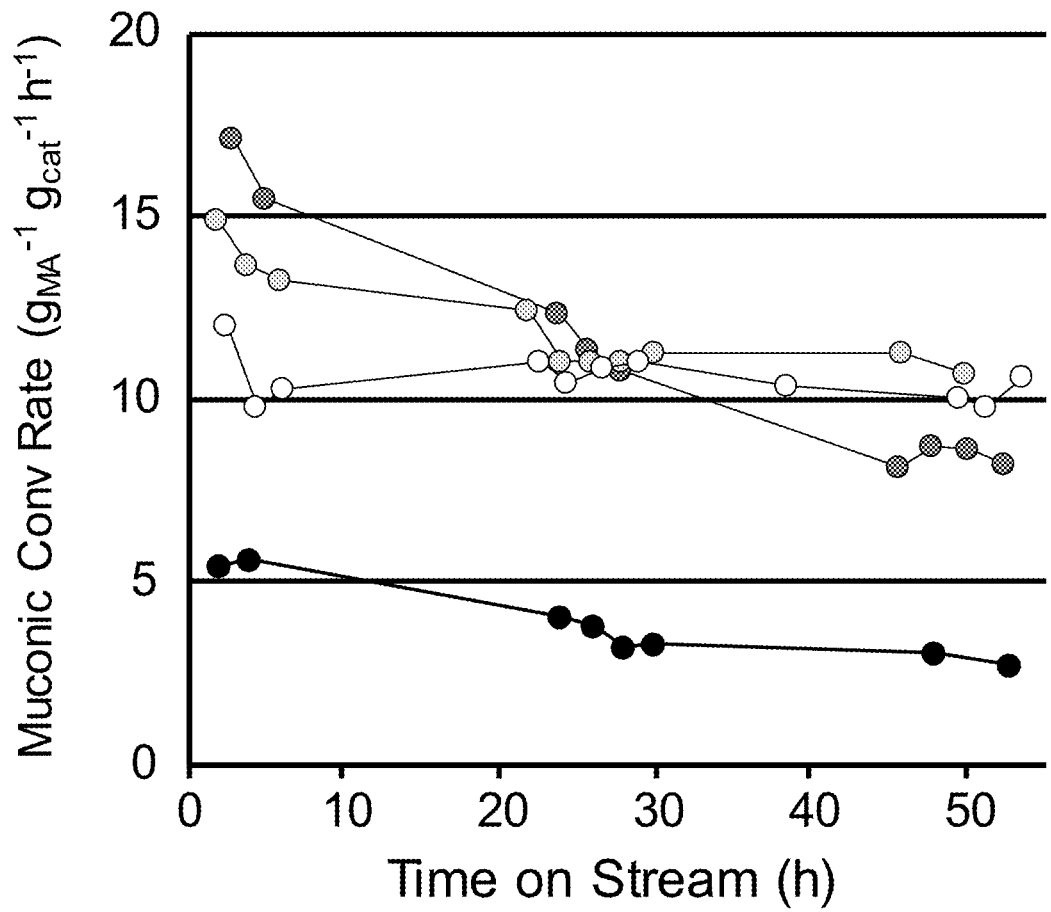
FIG. 15 illustrates time-on-stream data for various catalyst composition for the hydrogenation of muconic acid, according to some embodiments of the present disclosure.

To assess catalyst performance under continuous reaction conditions, hydrogenation activity and leaching stability of the uncoated catalyst and each scale of ALD-coated catalysts were evaluated using a trickle bed reactor (i.e. fixed bed reactor). Testing was initially performed in duplicate under partial conversion conditions (500 psig H$_2$, 24° C., weight hourly space velocity (WHSV) 19.5 h$^{-1}$). Under these conditions, the uncoated Pd/TiO$_2$ catalyst displayed significant decline in activity over time, with a final observed muconic acid conversion rate of 8.5±2 g$_{MA}$ g$_{cat}^{-1}$ h$^{-1}$ at greater than or equal to 40 hours time on stream (TOS) (see FIG. 15 and Table 8). Referring to the left side of FIG. 15, the top data set corresponds to uncoated catalyst; then 100 gram coated sample; then 10 gram coated sample; and the bottom data set corresponds to 100 mg coated sample. Variability was attributed to the low catalyst loading (6 mg) and diluent sand utilized for this reaction. Pd leaching was measured to be 1.4±0.7 ppm after 20 hours TOS, which translates to Pd leaching rate of 0.32 µg h$^{-1}$ under these reaction conditions. Prior to 20 hours TOS, a "wash out" effect was observed (Pd leaching 2.3±0.9 ppm, 0.52 µg h$^{-1}$), attributed to attrition of loosely bound Pd.

TABLE 8

Conversion activity and Pd leaching by uncoated and ALD-coated 0.5 wt % Pd/TiO$_2$ catalysts during partial conversion TOS muconic acid hydrogenation reactions.

| Catalyst | MA Conv. Rate ($g_{MA} \, g_{cat}^{-1} \, h^{-1}$) | Leaching (ppm) | Leaching Rate (µg h$^{-1}$) |
|---|---|---|---|
| Uncoated | 9 ± 2 | 1.4 ± 0.7 | 0.32 |
| 100-mg ALD-coated | 4 ± 1 | 0.3 ± 0.1 | 0.07 |
| 10-g ALD-coated | 11 ± 3 | 0.08 ± 0.04 | 0.02 |
| 100-g ALD-coated | 12 ± 3 | 0.05 ± 0.01 | 0.01 |

Compared to the uncoated catalyst, the 100-mg ALD-coated catalyst exhibited a greater than 4× decrease in Pd leaching, corresponding to 0.3±0.1 ppm after 20 hours TOS, which translates to 0.07 µg h$^{-1}$ under these reaction conditions (see Table 8). However, the Pd-normalized muconic acid conversion rate at greater than or equal to 40 hours TOS was also lower at 3.8±1 $g_{MA} \, g_{cat}^{-1} \, h^{-1}$ (see FIG. 15 and Table 8). In contrast, the 10-g and 100-g ALD-coated catalysts, did not experience the same activity reduction as the 100-mg ALD-coated catalyst. The 10-g ALD-coated catalyst displayed a muconic acid conversion rate after greater than or equal to 40 hours TOS of 11±3 $g_{MA} \, g_{cat}^{-1} \, h^{-1}$ and the 100-g ALD-coated catalyst displayed a muconic acid conversion rate at greater than or equal to 40 hours TOS of 12±3 $g_{MA} \, g_{cat}^{-1} \, h^{-1}$, both surpassing the greater than or equal to 40 hours TOS conversion rate of the uncoated catalyst due to the activity loss experience by the uncoated catalyst with time.

The uncoated, 100-mg ALD-coated, and 10-g ALD-coated catalysts were tested under complete conversion conditions (150 mg catalyst, 500 psi H$_2$, 78° C., WHSV 1.05 h$^{-1}$) with a biologically-derived muconic acid feed to evaluate the ALD-coated catalysts potential performance in an adipic acid biorefinery. Based on characterization described herein (see Table 7), batch reaction performance (see FIG. 14D), and partial conversion TOS performance (see FIG. 15), the 100-g catalyst is expected to display comparable behavior to the 100-mg and 10-g ALD-coated catalysts under complete conversion conditions. Under these conditions, all three catalysts tested displayed near quantitative yields (>99%) of high-purity adipic acid (see Table 9). During complete conversion reactions, Pd active material leaching from the uncoated catalyst was measured to be 0.5±0.2 ppm, or 0.14 µg h$^{-1}$. Pd active material leaching from the 100-mg ALD-coated catalyst was measured to be 0.09±0.01 ppm, or 0.03 µg h$^{-1}$, a nearly 5× leaching reduction compared to the uncoated catalyst. Likewise, Pd active material leaching from the 10-g ALD-coated catalyst was measured to be <0.05 ppm, or <0.01 µg h$^{-1}$. Pd active material leaching reduction achieved by the ALD-coated catalysts can ultimately lead to greater lifetime productivity (e.g. mass of muconic acid converted per hour per mass of catalyst per catalyst lifetime) than the uncoated catalyst.

TABLE 9

Pd and adipic acid yield during TOS muconic acid hydrogenation with the uncoated, 100-mg ALD-coated, and 10-g ALD-coated 0.5 wt % Pd/TiO$_2$ catalysts under complete conversion conditions.

| Catalyst | WHSV (h$^{-1}$) | Adipic acid yield* (%) | Pd leaching (ppm) |
|---|---|---|---|
| Uncoated | | >99 | 0.5 ± 0.2 |
| 100-mg ALD-coated | 1.05 | >99 | 0.09 ± 0.01 |
| 10-g ALD-coated | | >99 | <0.05 |

*Adipic acid yield of ~100% is based on the detection of no other compounds in the product stream as determined by HPLC analysis.

Thermal Stability Evaluation.

Post-TOS reaction analysis of the uncoated and 100-mg ALD-coated catalysts by thermogravimetric analysis (TGA) confirmed carbonaceous residues between about 7 wt % and about 8 wt % had accumulated on the catalysts during complete conversion reactions, motivating evaluation of thermal stability during oxidative regeneration. In this instance, the heightened thermal stability was attributed to interference of the expanse of nanocrystalline TiO$_2$, thereby disrupting nucleation sites for the phase change. It may be hypothesized that the use of a thin ALD Al$_2$O$_3$ coating may similarly affect the phase change kinetics of TiO$_2$ while still preserving the surface area.

To evaluate thermal stability through accelerated aging, the uncoated catalyst and the 100-mg ALD-coated catalyst were exposed to air at 700° C. for four hours, followed by a reduction at 200° C. for an additional two hours. The catalysts were characterized after thermal treatment by CO chemisorption and N$_2$ physisorption to assess structural impacts (see Table 10). The uncoated catalyst was observed to have undergone severe restructuring of both Pd and the TiO$_2$ support; most notably, the uncoated catalyst lost nearly 70% surface area and the CO uptake declined by nearly 90%, suggesting severe Pd sintering. In comparison, the 100-mg ALD-coated catalyst displayed far less dramatic effects upon thermal treatment. The surface area of the ALD-coated catalyst declined by only 21%. The thermally treated ALD-coated catalyst exhibited increased CO uptake as compared to the fresh ALD-coated catalyst, attributed to structural changes in the coating which increased CO binding site accessibility, potentially by increased porosity in the amorphous Al$_2$O$_3$ coating.

TABLE 10

Catalyst material properties for uncoated and 100-mg ALD-coated 0.5 wt % Pd/TiO$_2$ catalysts after 700° C. thermal treatment for four hours.

| | Entry No. | |
|---|---|---|
| | 1 | 2 |
| | 700° C. | 700° C. 100-mg |
| Parameter | Uncoated | ALD-coated |
| Surface area (m$^2$g$^{-1}$) | 44 ± 2 (−69%) | 96 ± 5 (−21%) |
| Pore volume (mL g$^{-1}$) | 0.26 ± 0.02 (−54%) | 0.47 ± 0.05 (NS) |
| Pore diameter (nm) | 15 ± 2 (+159%) | 7.1 ± 0.7 (+27%) |
| CO uptake (µmol g$^{-1}$) | 3 ± 1 (−88%) | 29 ± 5 (+107%) |

Figure 16A:
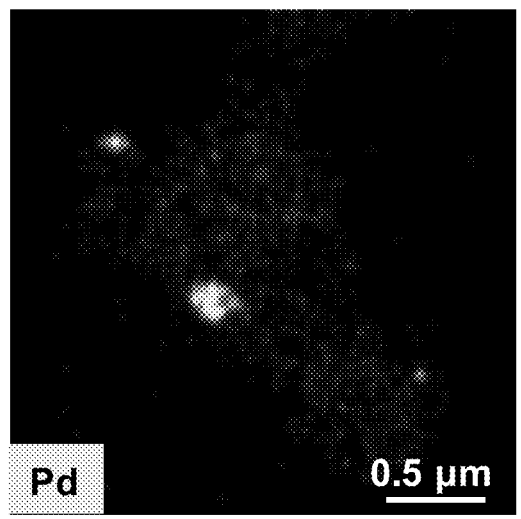
FIG. 16A illustrates scanning transmission electron microscopy coupled with energy dispersive x-ray spectroscopy (STEM-EDS) of uncoated and ALD-coated catalysts, according to some embodiments of the present disclosure.
Figure 16A:
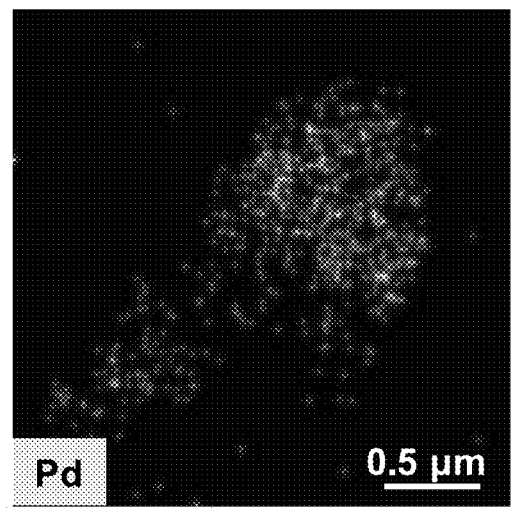

Beyond CO chemisorption and N$_2$ physisorption, the thermally treated uncoated and 100-mg ALD-coated catalysts were further characterized by XRD and scanning transmission electron microscopy coupled with energy dispersive x-ray spectroscopy (STEM-EDS) (see FIG. 16A). Referring again to FIG. 6, the XRD diffractogram of the thermally treated uncoated catalyst showed increased definition of narrow anatase $TiO_2$ peaks which were attributed to the increased crystallinity of the anatase phase, which may have caused the observed pore restructuring. Likewise, the appearance of Pd peaks was observed, reflective of an increase in Pd crystallite size. The XRD diffractogram of the thermally treated 100-mg ALD-coated catalyst showed no indication of morphological changes to the $TiO_2$, nor were peaks associated with Pd crystallites apparent. Referring to FIG. 16A, STEM-EDS mapping of the catalysts was in agreement with the data collected by chemisorption, physisorption, and XRD. Pd crystallites on the thermally treated uncoated catalyst were measured with diameters between about 100 nm and about 500 nm, with some larger than 500 nm, while the thermally-treated 100-mg ALD-coated catalyst displayed retention of highly dispersed ~2 nm Pd nanoparticles with no indication of sintering.

Figure 16B:
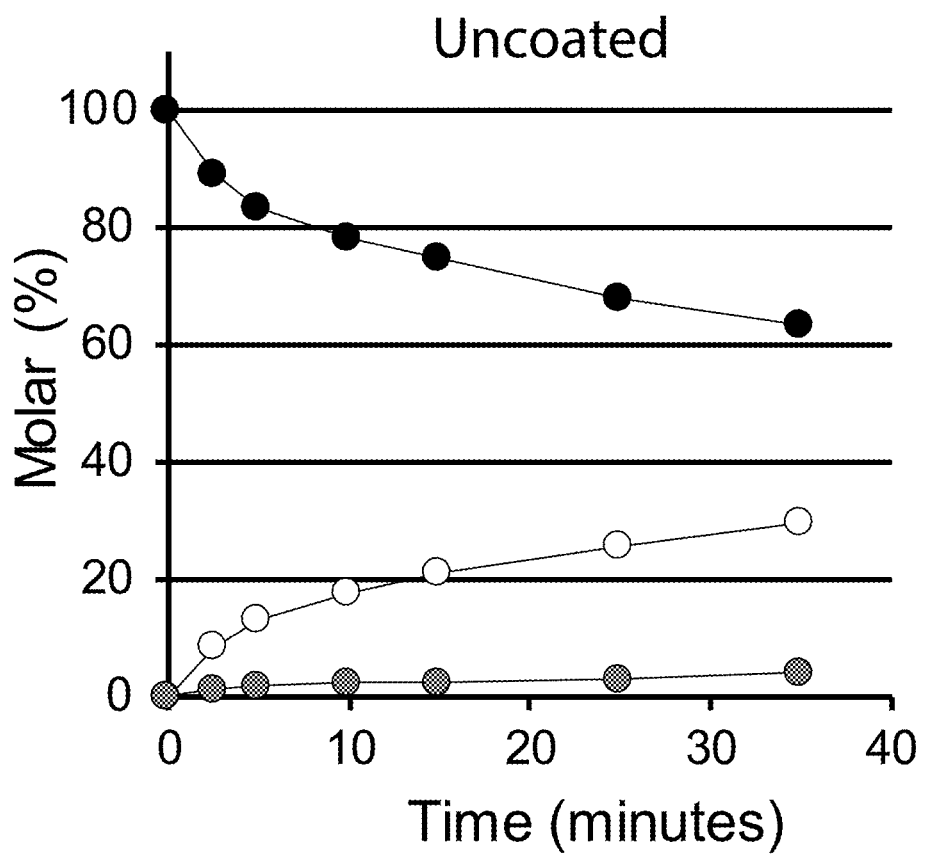
FIGS. 16B and 16C illustrate the impact of a four-hour thermal treatment on catalytic activity of ALD-coated and uncoated catalysts for muconic acid hydrogenation, according to some embodiments of the present disclosure.
Figure 16C:
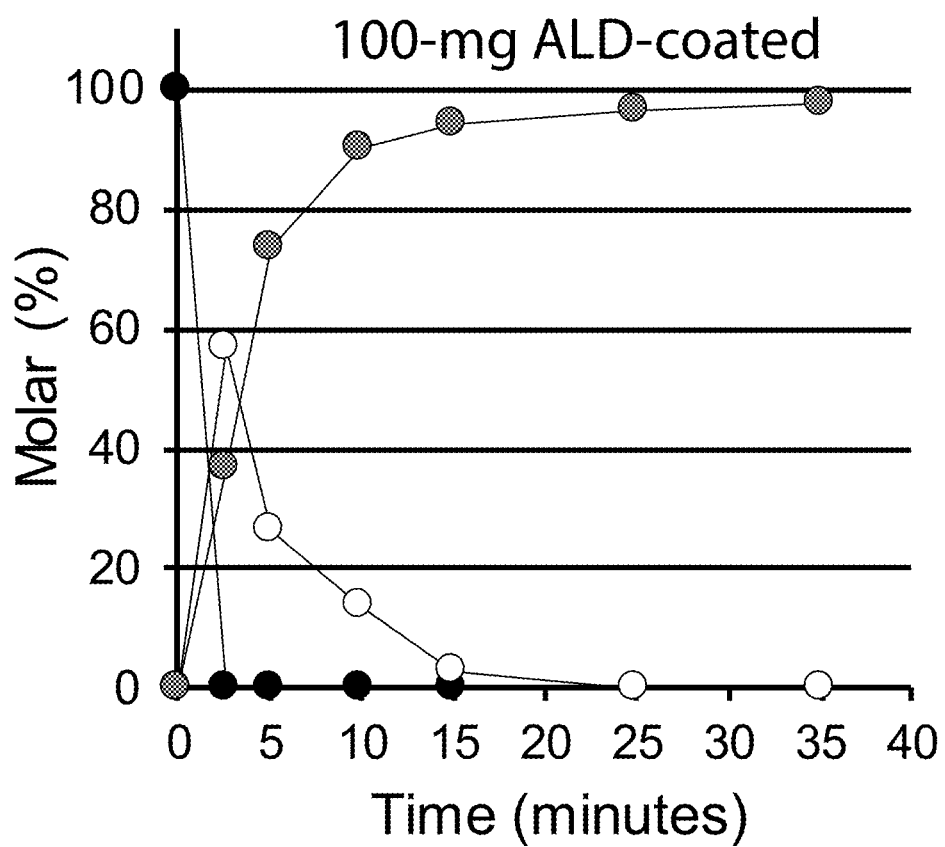

To evaluate the impact of the four-hour 700° C. treatment on catalytic activity for muconic acid hydrogenation, the thermally treated catalysts were evaluated for batch muconic acid hydrogenation activity under identical conditions as used for initial activity tests (see FIGS. 16B and 16C). After 35 minutes of reaction, the yield of adipic acid by the thermally treated uncoated catalyst experienced over 95% reduction relative to the fresh uncoated catalyst. Conversely, the 100-mg ALD-coated catalyst retained quantitative adipic acid yield after thermal treatment. Comprehensively, these results underscore the ability of ALD coatings to impart robust thermal stability to Pd/$TiO_2$ catalysts.

Figure 17A:
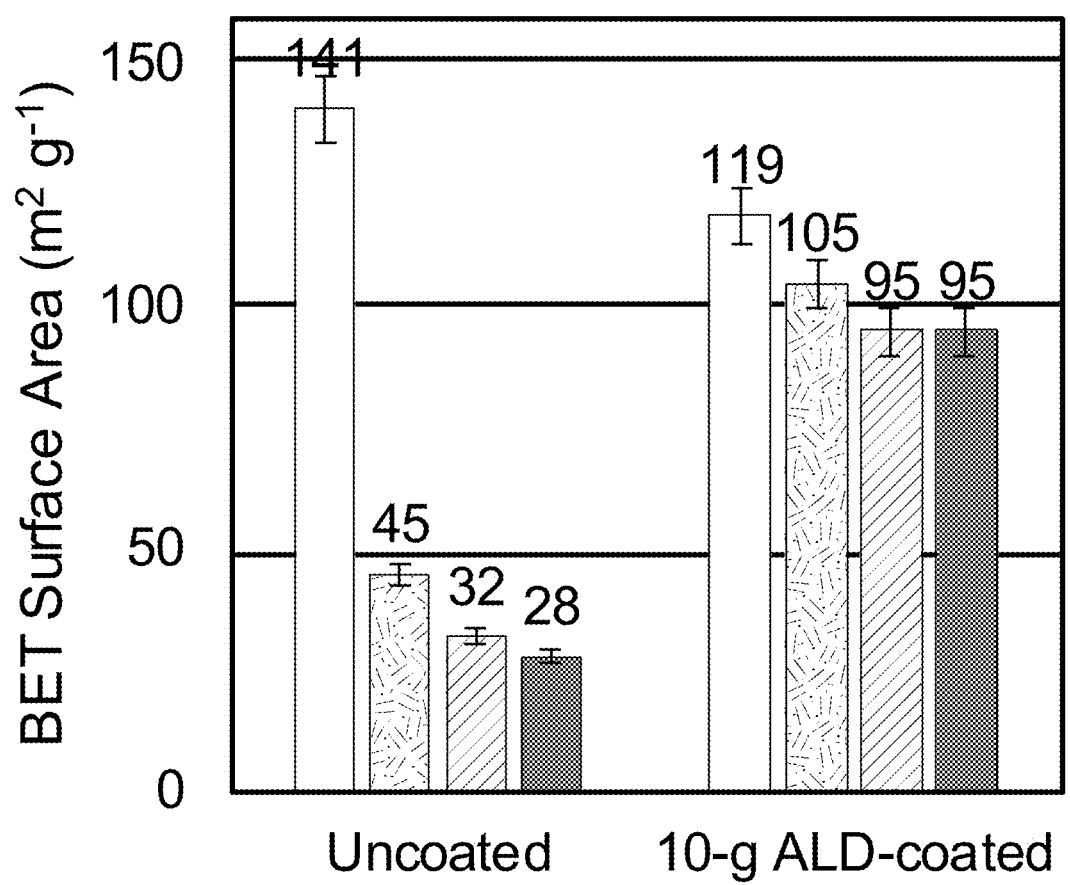
FIGS. 17A-17C illustrate the impact of multiple thermal treatments on various catalyst metrics, uncoated versus coated, according to some embodiments of the present disclosure.
Figure 17B:
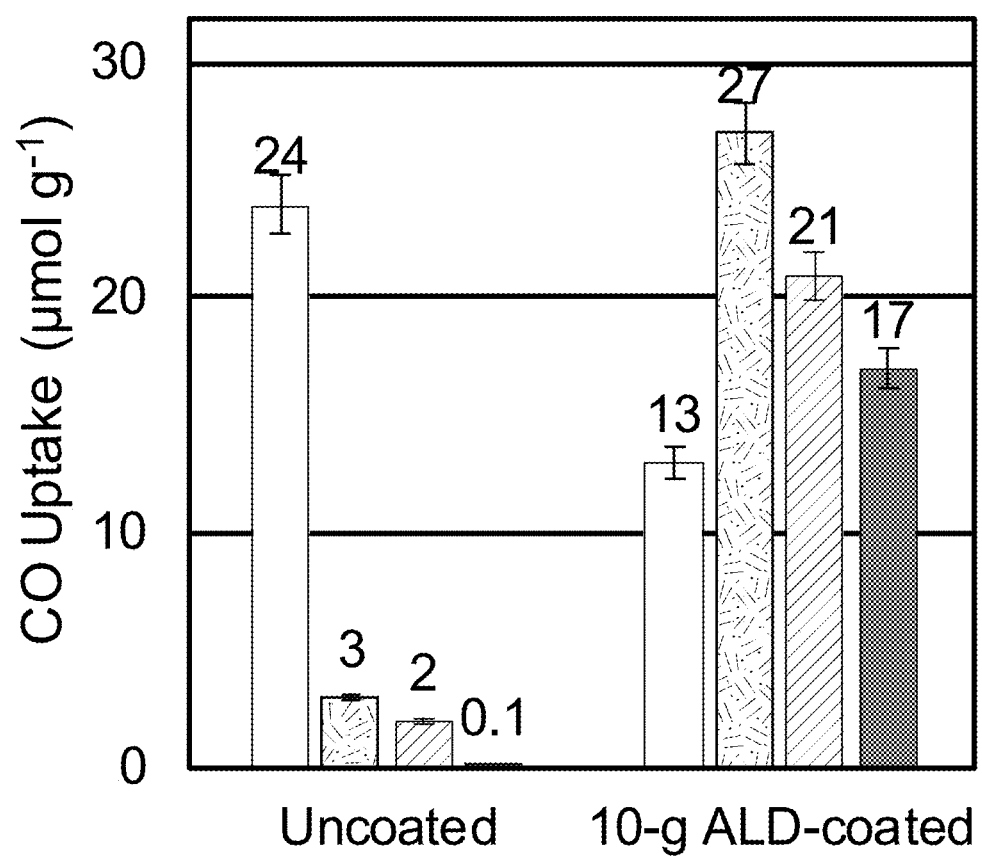
Figure 17C:
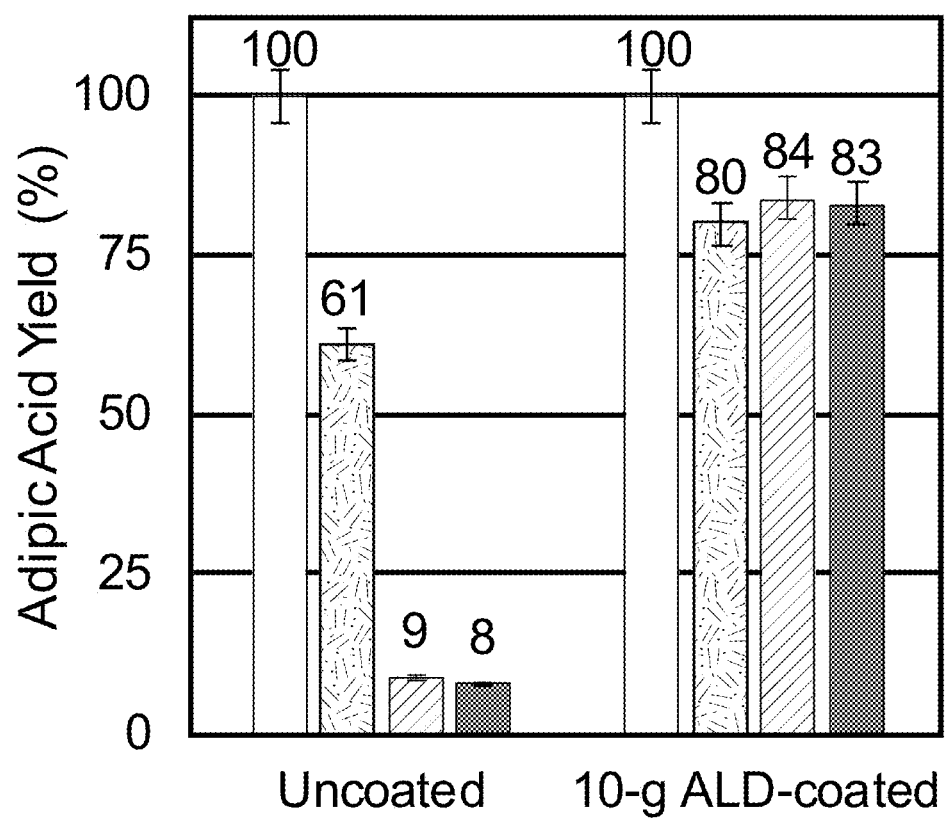

In contrast to a single thermal treatment, industrial catalysts are often exposed to multiple high-temperature regenerations throughout their lifetimes. As such, the uncoated catalyst and 10-g ALD-coated catalyst were exposed to a "simulated lifetime" consisting of five successive thermal treatments to determine if previously observed stability benefits were retained upon sequential thermal cycling. Each thermal treatment consisted of oxidative exposure at 700° C. for two hours, followed by reduction at 200° C. for two hours. Characterization and batch reactor muconic acid hydrogenation activity testing was performed after zero, 1, 3, and 5 treatments to evaluate the progressive impact of regenerative treatments (see FIGS. 17A-17C; from left to right, fresh catalyst (zero treatments), 1 treatment, 3 treatments, and 5 treatments). The uncoated catalyst was severely impacted after only one regenerative cycle, as discussed previously. After five thermal cycles, the uncoated catalyst lost 80% of its surface area and displayed negligible CO uptake (see FIGS. 17A and 17B). The adipic acid yield in batch muconic acid hydrogenation reactions fell to only 8%, compared to >99% yield by the fresh uncoated catalyst (see FIG. 17C). Conversely, the 10-g ALD-coated catalyst lost only 22% surface area and the CO uptake experienced 30% increase after the final thermal treatment, compared to the fresh 10-g ALD-coated catalyst (see FIGS. 17A and 17B). Likewise, the adipic acid yield fell only 17% during batch muconic acid hydrogenation reactions, from >99% yield by the fresh catalyst to 83% after five thermal treatments (see FIG. 17C).

Figure 17D:
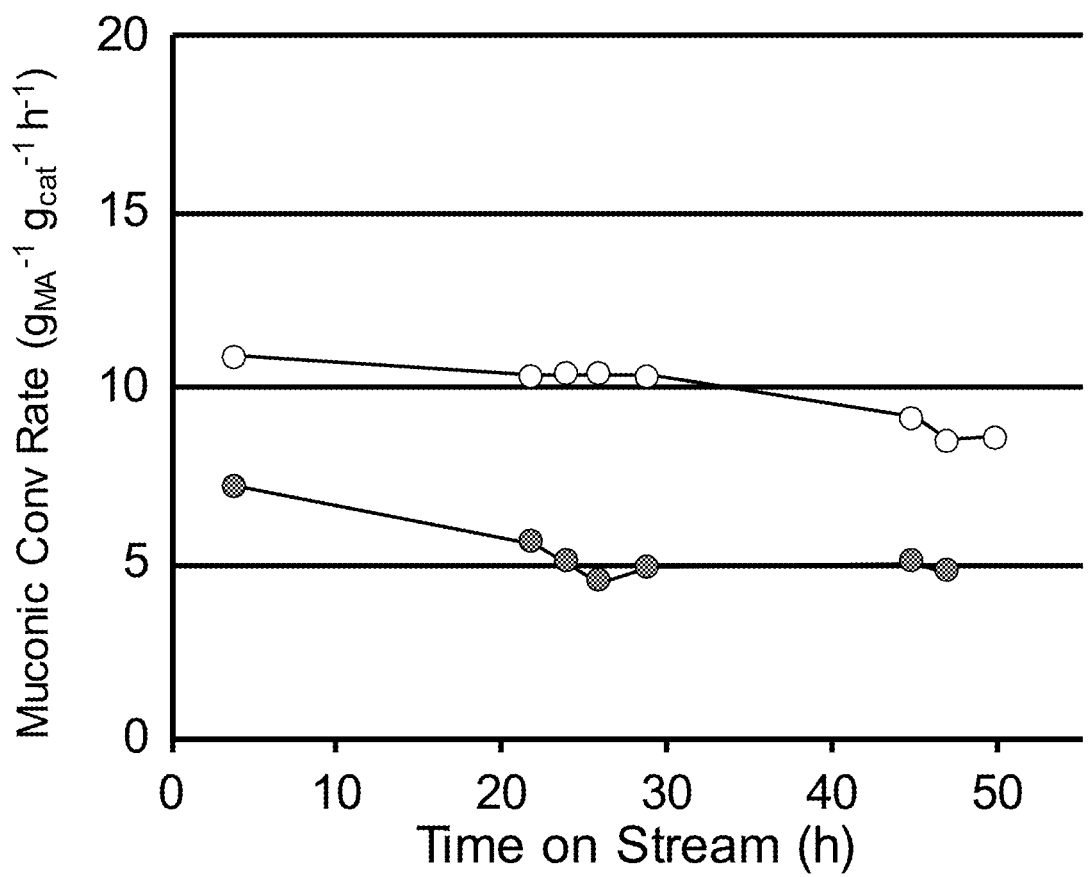
FIG. 17D illustrates a comparison of uncoated catalyst versus ALD-coated catalyst of the hydrogenation of muconic acid, after having been exposed to five thermal treatments, according to some embodiments of the present disclosure.

Lastly, to demonstrate that thermal stability enhancements observed for batch reaction activity are transferable to a continuous flow system, the uncoated and 10-g ALD-coated catalysts were tested for continuous muconic acid hydrogenation activity after five thermal treatments (see FIG. 17D; empty markers—10 gram sample of ALD-coated catalyst after 5 treatments; filled markers—uncoated catalyst after 5 treatments). The conditions used for these reactions were identical to the conditions reported above for partial conversion (6 mg catalyst, 500 psig $H_2$, 24° C., WHSV 19.5 $h^{-1}$). The muconic acid conversion rate of the thermally treated uncoated catalyst was 5 $g_{MA}$ $g_{cat}^{-1}$ $h^{-1}$ at ≥40 h TOS, a reduction of 44% relative to the fresh uncoated catalyst. The muconic acid conversion rate of the thermally treated 10-g ALD-coated catalyst was 9 $g_{MA}$ $g_{cat}^{-1}$ $h^{-1}$ at ≥40 h TOS, a reduction of less than 20% relative to the fresh 10-g ALD-coated catalyst. In sum, the thermal stability results after five thermal treatments are in agreement with those of the single-treatment test and confirm that the application of the $Al_2O_3$ ALD coating on Pd/$TiO_2$ can lead to drastic structural durability enhancements of both the Pd and $TiO_2$.

In addition, to demonstrate that the ALD coating also provides necessary durability enhancements at typical regenerative temperatures, the uncoated and 10-g ALD-coated catalysts were also exposed to five successive oxidative thermal treatments at 550° C. for two hours, followed by reductions at 200° C. for two hours. Subsequent characterization by CO chemisorption and $N_2$ physisorption confirmed that five 550° C. treatments resulted in 26% loss of surface area and 80% reduction in CO uptake on the uncoated catalyst, while the 10-g ALD-coated catalyst was nearly unaffected across all five treatments (see Table 11).

TABLE 11

Material properties of uncoated and 10 g ALD-coated Pd/$TiO_2$ before and after five thermal treatments at 550° C.

| Parameter | Fresh Uncoated | Five 550° C. Treatments Uncoated | Fresh 10 g ALD-coated | Five 550° C. Treatments 10 g ALD-coated |
| --- | --- | --- | --- | --- |
| Surface area ($m^2$ $g^{-1}$) | 140 ± 13 | 103 ± 5 (−26%) | 121 ± 3 | 117 ± 6 (No change) |
| Pore volume (mL $g^{-1}$) | 0.57 ± 0.05 | 0.44 ± 0.04 (−23%) | 0.48 ± 0.02 | 0.51 ± 0.04 (No change) |
| Pore diameter (nm) | 5.8 ± 0.2 | 6.5 ± 0.5 (+12%) | 5.8 ± 0.8 | 5.7 ± 0.4 (No change) |
| CO uptake (μmol $g^{-1}$) | 24 ± 4 | 5 ± 1 (−80%) | 13 ± 2 | 20 ± 3 (+54%) |

Synthesis of Pd/$TiO_2$.

Pd/$TiO_2$ catalysts were prepared in-house. Blank, pelletized anatase $TiO_2$ support was initially ground and sieved prior to loading with palladium. Pd/$TiO_2$ samples were prepared with supports sieved to between 30 mesh and 50 mesh (corresponding to between 300 μm and 600 μm) to facilitate FIB lift out for APT and STEM-EDX characterization, as well as supports sieved to less than 140 mesh (corresponding to less than 105 m) to facilitate catalyst activity testing with negligible mass transfer limitations. Pd was loaded by adapting methods for strong electrostatic adsorption using pH adjustment. For the typical preparation, 10 g crushed and sieved $TiO_2$ was added to a large beaker with ~350 mL of deionized water. The solution was then raised to pH 11 using NaOH to deprotonate the $TiO_2$ support. In a separate beaker, tetraaminepalladium (II) chloride monohydrate was added to ~200 mL of DI water. Both solutions were then combined, readjusted to pH 11, and stirred at 500 rpm for at least 48 hours. After stirring, the catalyst particles were vacuum filtered and dried overnight at room temperature. The catalyst was loaded into a tube furnace, dried at 110° C. for 2 hours in 200 sccm of $N_2$, and reduced at 150° C. in 200 sccm of $H_2$ for 4 hours.

Fluidized bed $Al_2O_3$ coatings were deposited by ALD on powder $Pd/TiO_2$ catalysts sieved to less than 140 mesh (corresponding to less than 105 m) using TMA and $H_2O$ precursors via a fluidized bed ALD coating process provided by an industrial partner, Forge Nano. ALD was performed at 200° C. with sufficient gas flow (nitrogen and precursors) to fluidize the powder bed. Process gasses were entrained alternately into the fluidization gas. Both precursors were held at 40° C. The reaction was monitored using in situ mass spectrometry (MS) of the gas stream exiting the powder bed. Each half-reaction was deemed complete when the reaction biproducts decreased and the signature fragments of the intact precursor molecules could be observed in the exhaust gas.

Catalyst Oxidation and Thermal Aging.

Thermal aging of catalysts was performed in a tube furnace by exposing the materials to 200 sccm flowing air at desired temperature (550° C. or 700° C.) for 2 hours or 4 hours, followed by reduction at 200° C. in 200 sccm $H_2$ for 2 hours.

Spent Catalyst Characterization.

Due to the high activity of $Pd/TiO_2$ for muconic acid hydrogenation, partial conversion tests were limited to ≤15 mg of catalyst loading in the batch and trickle bed reactor. Although the quantity of spent catalyst was too small to allow for extensive spent catalyst characterization, the decline of catalyst activity and extent of Pd leaching was monitored by 100-hour time-on-stream (TOS) testing in the trickle bed reactor for the uncoated and down-selected ALD $Pd/TiO_2$ catalysts. To facilitate spent catalyst characterization, 100-h time-on-stream testing was also performed in the trickle bed reactor with excess catalyst loading (150 mg) under complete conversion conditions. To characterize the spent catalyst, physicochemical properties were determined by CO chemisorption, nitrogen physisorption, and TGA, as described above.

Batch Reactor Testing.

Batch reactor screenings were performed in a Parr multi-batch reactor system. To the reactors, 15 mg of catalyst was loaded with 20 g of 1 wt % cis,cis-muconic acid in ethanol. The reactors were sealed, purged with inert gas three times, and pressurized with $H_2$ to 350 psig at room temperature. Catalyst testing was then performed in duplicate to measure muconic acid hydrogenation activity and Pd leaching. After the reaction was complete, the reactor contents were vacuum filtered using a 0.2-μm PES filter assembly to remove the catalyst particles. The solutions were blown down overnight in flowing $N_2$ at room temperature to remove the solvent, and the solid dicarboxylic acid product was analyzed by ICP-MS to determine extent of Pd leaching. All batch reactions were run in duplicate with average conversion values reported and variations between duplicate reactions of ≤5%. Pd leaching values are based on independent duplicate reactions.

Control reactions were performed to (i) examine the extent of Pd leaching with only adipic acid in ethanol, (ii) examine the impact of catalyst pre-reduction on leaching, and (iii) assess the hydrogenation activity of leached Pd with muconic acid. To test the impact of only adipic acid on Pd leaching, reactions were carried out under the standard conditions described above using 1 wt % adipic acid in ethanol in place of 1 wt % muconic acid in ethanol. After terminating the reaction and removing the catalyst by filtration, ethanol was removed by $N_2$ blowdown and leached Pd content was measured by ICP-MS. To evaluate the impact of pre-reduction on Pd leaching, 15 mg of catalyst was loaded into the reactor with 10 mL of ethanol, the reactor was sealed, purged with inert gas three times, pressurized with $H_2$ to 150 psig at room temperature, and headed to 110° C. for 2 hours. The reactors were then cooled to room temperature, purged with inert gas, and loaded with an additional 10 g of 2 wt % cis,cis-muconic acid in ethanol through an in situ sampling port on the reactor head. The reactor was then re-pressurized with $H_2$ to 350 psig at room temperature to carry out the hydrogenation reaction under standard conditions, as described above. To test the impact of leached Pd on observed hydrogenation activity, reactions were initiated under the standard conditions described above; after 10 min of reaction, the catalyst was removed by filtration and the reactor was re-pressurized with $H_2$ and allowed to react for an additional 25 min to observe any continued activity that could be attributed to leached Pd in the effluent.

Pd-normalized muconic acid conversion was calculated by dividing mmol muconic acid converted per mmol Pd at 2.5 min of reaction. Pd-normalized adipic acid production was calculated by dividing mmol adipic acid produced per mmol Pd at 2.5 min of reaction. Initial muconic acid conversion and adipic acid production values are normalized to total Pd loaded in the reactor rather than accessible Pd active material to avoid convolution errors in CO and $H_2$ chemisorption results due to uptake by the $TiO_2$ support.

Trickle Bed Reactor Testing.

Continuous flow reactor testing was performed using a Parr tubular reactor system operated in a down-flow trickle bed configuration. The reactor system was outfitted with an HPLC pump to deliver liquid phase reactants, two mass flow controllers to control inert and $H_2$ gas delivery, tube-in-tube heat exchanger for cooling the reactor effluent, high-pressure 1-L stainless steel knockout pot with bottom sampling valve, and a solenoid-controlled backpressure regulator to maintain system pressure. Reactions were performed with gas and liquid reagents fed to through the top of a 12" long, ½" inner-diameter stainless steel reaction tube surrounded by a clamshell furnace. The tube temperature was monitored and controlled using an internal thermocouple centered in the catalyst bed. The tube was initially packed with inert 2-mm glass beads held in place with quartz wool. The catalyst bed was then loaded at the tube mid-height using particles previously sieved to less than 140 mesh (corresponding to less than 105 m) to facilitate activity testing with negligible mass transfer limitations. Inert quartz sand sieved to fit through a 60-80 mesh opening (corresponding to between 180 m and 250 m) and placed at the base and top of the catalyst packing to serve as a support. The remaining reactor tube void was then filled with inert glass beads and sealed with quartz wool.

Continuous hydrogenation reactions were performed with $H_2$ supplied at 100 sccm, and system pressure maintained at 500 psig. The mobile phase consisted of commercial cis, cis-muconic acid dissolved in 200-proof ethanol to ~1 wt % (muconic acid 8 g $L^{-1}$). Commercial succinic acid was added as an internal standard (succinic acid 0.8 g $L^{-1}$). The mobile phase was delivered at a flow rate to achieve the desired WHSV of muconic acid. Liquid effluent samples were collected from the knockout pot, syringe-filtered, and analyzed by HPLC. Subsamples of the liquid filtrate were filtered, and the solvent was removed by overnight $N_2$ blowdown to quantify leached Pd in the solid dicarboxylic product by ICP-MS. Flow reactor adipic acid productivity was calculated by dividing the mass of adipic acid produced per hour by the mass of catalyst loaded into the reactor. Control reactions were also performed to examine the rate of Pd leaching at varying WHSV for a given catalyst loading, which revealed no apparent correlation between WHSV and leaching. Partial conversion experiments were performed at 24° C. with 6 mg of catalyst for both the uncoated and ALD coated catalyst samples. Complete conversion experiments were performed at 78° C. with 150 mg of catalyst for both the uncoated and ALD coated catalyst samples and carbon accumulation on the catalyst was measured by TGA after flowing ~15 g of muconic acid past the catalyst.

Biological Production and Separation of Muconic Acid.

When indicated, biobased muconic acid was used as the substrate for reaction testing. All biobased muconic acid used in this study was produced biologically by fed-batch feeding of benzoate to an engineered strain of *Pseudomonas putida*, KT2440-CJ102. Following fermentation, cells and proteins were removed and fermentation broth was purified by activated carbon. Muconic acid was recovered by pH-controlled crystallization, followed by purification in ethanol.

Results Data Set #3: Palladium Active Material on $TiO_2$ or $Al_2O_3$ Cores, Coated with $Al_2O_3$ or $TiO_2$-Sulfur Tolerance and Naphthalene Hydrogenation Catalyst Preparation.

Pd/$Al_2O_3$ catalysts (i.e. $Al_2O_3$ core material having active material (palladium) on the surface of the core) were prepared using commercial metal oxide supports and spray impregnation techniques to achieve a nominal Pd loading of 0.5 wt %. The catalysts were subsequently overcoated by ALD using a fluidized bed reactor system at the 3-g scale.

Batch Reaction Testing.

Sulfur tolerance was tested using batch naphthalene hydrogenation reactions performed in the presence or absence of DMDS (dimethyl disulfide). The reaction conditions are as follows: 25 mg catalyst, 10 mL 1 wt % naphthalene in tridecane, 200° C., stirring at 1200 rpm, 40 bar hydrogen, 75 min time on stream. The amount of DMDS used for reactions was based on the nominal palladium loading and resulted in a S:Pd molar ratio of approximately 1:5. Experiments were performed in triplicate, and error bars provided in FIG. 18 represent ±σ/2.

Results.

Figure 18:
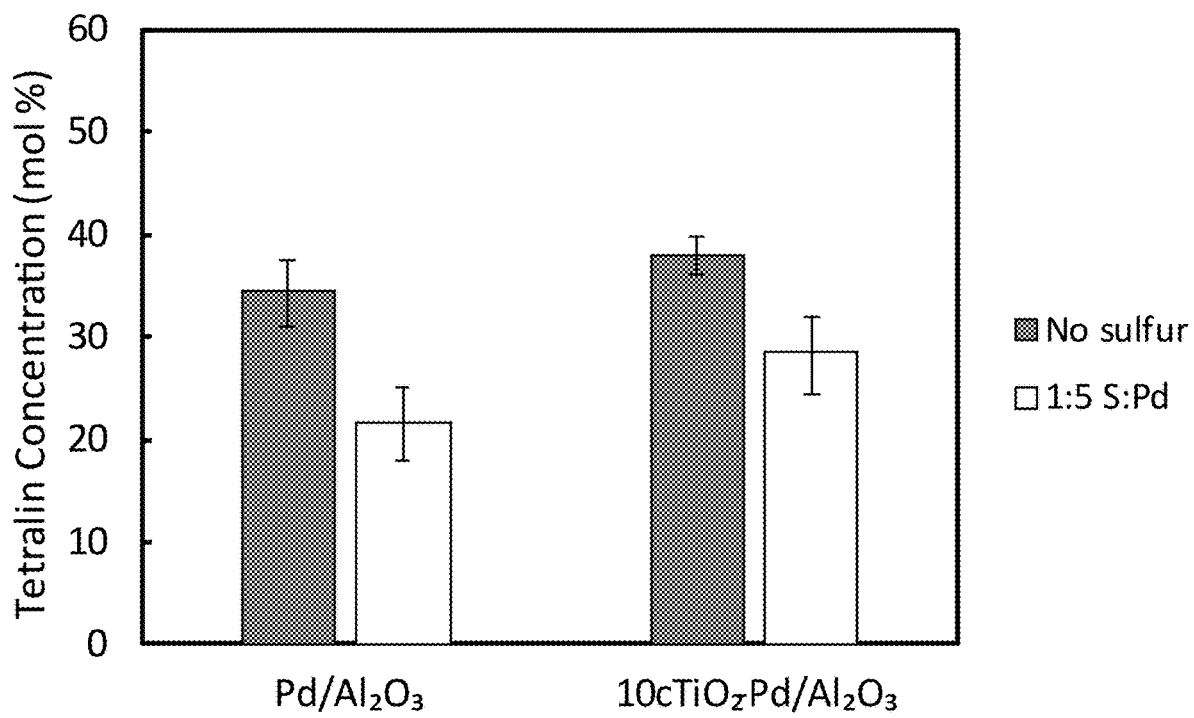
FIG. 18 illustrates sulfur tolerance data, comparing uncoated catalyst to ALD-coated catalyst, according to some embodiments of the present disclosure.

Referring to FIG. 18, on the uncoated Pd/$Al_2O_3$ catalyst, the introduction of sulfur resulted in a ca. 36% reduction in the concentration of the hydrogenated product tetralin compared to reaction performed in the absence in sulfur. The reduction in activity is attributed to poisoning of the active material by strongly-bound atomic sulfur. In contrast, the reduction in tetralin concentration in the presence of DMDS was limited to ca. 25% over a Pd/$Al_2O_3$ catalyst having ten ALD coatings of $TiO_2$ (noted as 10c in FIG. 18), highlighting the potential for ALD coatings to improve stability against sulfur poisoning.

The improved sulfur tolerance of the $TiO_2$-coated catalysts is attributed to the formation of electron deficient Pd sites, which result from strong interactions with electronegative $TiO_2$ coatings. The $TiO_2$ coatings may also improve resistant to the formation of sulfates on the support, which can deactivate the catalyst due to pore blocking. Application of $Al_2O_3$ coatings also resulted in an increase in sulfur tolerance, although the productivity observed over the $Al_2O_3$-coated catalysts was generally lower than the $TiO_2$-coated catalysts. These data suggest that optimized $TiO_2$ ALD coatings can effectively improve sulfur tolerance without negatively impacting catalyst activity.

Results Data Set #4: $TiO_2$ Cores Coated with $Al_2O_3$—Crush Strength

Catalyst Preparation.

Alfa Aesar $TiO_2$ ⅛" pellets were coated by stop-flow with $AlO_3$ ALD to evaluate improvements in crush strength. Ten pellets were weighed out and loaded onto a stainless-steel mesh carrier with wire bins to keep the pellets in place. $Al_2O_3$ ALD was performed using sequential exposures trimethylaluminum (TMA) and water as precursors which were maintained at a constant temperature of 21° C. The ALD reactor was operated at 200° C. in stop slow mode. The duration and carrier gas flows for the ALD process are given in Table 12. The ALD coating consisted of 15 ALD cycles.

Crush Strength Measurements.

The single pellet crush strength was measured using a Chatillon Model MT tension/compression mechanical test stand equipped with a DFE Series digital force gauge. All measurements were performed in the radial configuration on as-prepared pellets with a length:diameter ratio of at least 1.

TABLE 12

ALD Coating Conditions.

| | TMA | | | | | $H_2O$ | | | | |
|---|---|---|---|---|---|---|---|---|---|---|
| Sequence | Pre | Dose | Soak | Purge | Evac | Pre | Dose | Soak | Purge | Evac |
| Time (s) | 1 | 5 | 80 | 90 | 15 | 1 | 5 | 80 | 90 | 15 |
| MFC 1 (sccm) | 40 | 40 | 5 | 40 | 0 | 60 | 60 | 5 | 60 | 0 |
| MFC 2 | 60 | 60 | 5 | 60 | 0 | 60 | 60 | 5 | 60 | 0 |
| MFC 3 | 60 | 60 | 5 | 60 | 0 | 40 | 40 | 5 | 40 | 0 |
| MFC 4 | 40 | 40 | 5 | 40 | 0 | 40 | 40 | 5 | 40 | 0 |

Results.

The crush strength data in Table 13 represent the average of at least 10 measurements and the error is reported as +. For the uncoated $TiO_2$ catalyst pellet, only 10 Newtons of force were required to break the pellet. After 15 cycles of $Al_2O_3$ ALD, the $TiO_2$ pellet crush strength increased by 160% to 34 Newtons. Characterization of the catalyst pellet confirmed comparable surface area, pore volume, and pore diameter after ALD coating. These results highlight the potential for ALD coatings to improve mechanical crush strength for packed bed catalyst operations without significantly impacting the catalyst support morphology.

TABLE 13

Crush strength and physical properties of
uncoated and ALD coated TiO$_2$ pellets.

| Parameter | Uncoated TiO2 Pellet | ALD Coated TiO2 Pellet |
|---|---|---|
| Crush Strength (Newtons) | 13 ± 5 | 34 ± 9 |
| Surface Area (m$^2$ g$^{-1}$) | 149 | 142 |
| Pore Volume (mL g$^{-1}$) | 0.41 | 0.37 |
| Pore Diameter (nm) | 11 | 10 |

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A composition comprising:
    a core comprising Al$_2$O$_3$ and having a characteristic length between about one micron and about one millimeter;
    a particle comprising a noble metal deposited on a surface of the core, and
    a coating comprising TiO$_2$, wherein:
        the coating is positioned on the surface of the core and is in physical contact with the particle,
        the particle has a diameter between greater than about one nanometer and less than about 20 nanometers,
        the coating has a thickness about equal to the diameter of the particle, and
        the coating covers less than 100% of the core.

2. The composition of claim 1, wherein the particle comprises at least one of platinum or palladium.

3. The composition of claim 1, wherein the particle comprises at least one of an amorphous particle or a crystalline particle.

4. The composition of claim 1, wherein the characteristic length is between one micron and 50 microns.

5. The composition of claim 1, wherein the diameter is between greater than about one nanometer and about 10 nanometers.

6. The composition of claim 1, wherein the coating is applied by at least one cycle of an atomic layer deposition method.

7. The composition of claim 1, wherein the composition has a crush strength between about 8 Newtons and about 43 Newtons.

8. A method comprising:
    contacting muconic acid with a solid catalyst, wherein:
        the contacting converts at least a portion of the muconic acid to adipic acid, and
        the solid catalyst comprises:
            a core comprising Al$_2$O$_3$ having a characteristic length between about one micron and about one millimeter;
            a particle comprising a noble metal deposited on a surface of the core, and
            a coating comprising TiO$_2$, wherein:
                the coating is positioned on the surface of the core and is in physical contact with the particle,
                the particle has a diameter between greater than about one nanometer and less than about 20 nanometers,
                the coating has a thickness about equal to the diameter of the particle, and
                the coating covers less than 100% of the core.

\* \* \* \* \*